(12) United States Patent
Minami et al.

(10) Patent No.: US 6,967,632 B1
(45) Date of Patent: Nov. 22, 2005

(54) MULTI-MONITOR, AUXILIARY MONITOR, AND MONITOR SUPPORTER

(75) Inventors: Takashi Minami, Kokubu (JP); Yasushi Matsumura, Hayato-cho (JP); Akio Nishino, Hayato-cho (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 09/468,581

(22) Filed: Dec. 20, 1999

(30) Foreign Application Priority Data

Dec. 18, 1998 (JP) .................................. 10-361449

(51) Int. Cl.⁷ .............................................. G09G 5/00
(52) U.S. Cl. ...................... 345/1.3; 345/905; 345/2.1; 361/610; 361/724; 361/727; 361/681; 348/778; 348/785; 348/788; 348/789; 403/43; 403/61; 403/80; 403/86
(58) Field of Search ........................ 345/1.1, 1.3, 3.1, 345/5, 211, 213, 214; 361/610, 724, 727, 361/681, 682; 348/778, 785, 788, 789, 794; 403/43, 61, 80, 86, 164, 188

(56) References Cited

U.S. PATENT DOCUMENTS

| | | | | |
|---|---|---|---|---|
| 4,720,781 A | * | 1/1988 | Crossland et al. | 345/173 |
| 5,128,662 A | * | 7/1992 | Failla | 248/924 |
| 5,590,021 A | * | 12/1996 | Register | 248/923 |
| 5,687,939 A | * | 11/1997 | Moscovitch | 248/122.1 |
| 5,745,340 A | * | 4/1998 | Landau | 345/1.1 |
| 5,949,643 A | * | 9/1999 | Batio | 345/168 |
| 6,222,507 B1 | * | 4/2001 | Gouko | 345/1.1 |
| 6,262,785 B1 | * | 7/2001 | Kim | 345/903 |
| 6,295,038 B1 | * | 9/2001 | Rebeske | 345/1.1 |
| 6,302,612 B1 | * | 10/2001 | Fowler et al. | 16/224 |
| 6,339,410 B1 | * | 1/2002 | Milner et al. | 345/1.1 |

FOREIGN PATENT DOCUMENTS

JP         63-89121         6/1988

OTHER PUBLICATIONS

Japanese and English translation of Japanese Office Action of Application No. 10-361449, dated Nov. 25, 1999.

* cited by examiner

*Primary Examiner*—Henry N. Tran
(74) *Attorney, Agent, or Firm*—Hogan & Hartson LLP

(57) ABSTRACT

A multi-monitor is provided with a first display device having a display screen and a second display device having a display screen smaller than the display screen of the first display device, and a supporting mechanism which is mountable on an outside portion of the first display device, and supports the second display device rotatably about a first axis and a second axis intersecting the first axis. The first second display device is driven in accordance with the same operation system as the first display device.

16 Claims, 25 Drawing Sheets

MULTI-MONITOR, AUXILIARY MONITOR, AND MONITOR SUPPORTER

This application is based on patent application No. 10-361449 filed in Japan, the contents of which are hereby incorporated by references.

BACKGROUND OF THE INVENTION

This invention relates to a multi-monitor, auxiliary monitor, and monitor supporter.

In recent years, there has been remarkable developments in computer technology which could be called as a representative of electronic equipments. In the hardware fields, an amount of information to be handled within a specific time is increased by a great progress in the microprocessor. On the other hand, operating systems which could be handled by people who are not familiar with computers have been developed in the software field. Along with such developments, personal computers and the like have become more familiar.

Having such a background where working environments have been settled in both the hardware and software fields, a technical concept of multi-monitors has been proposed.

Specifically, Windows 98 (trademark) developed by Microsoft and commercially available at present is a typical example of the operating system compatible with multi-monitors. This operation system is such a technique that two or more display devices are connected with one terminal, and these two or more display devices can be used at will on the same system as if one display device were separated into two or more sections.

Conventionally, one display device carrying a multi-window compatible operating system has been used. In this case, a plurality of software programs are opened, and display is switched if necessary. However, there is a limit in a display data amount handled by only one display device.

The multi-monitor is a technique to solve such a problem, and a display information amount which can be used by the same system is increased by newly adding a plurality of the display devices in proximity to a main display device, thereby remarkably improving the operation efficiency. CRT displays (CRT: cathode-ray tube) which is most spread in use as a display device for this multi-monitor, and at least two CRT displays are placed side by side. However, if two CRT displays are placed side by side using a multi-monitor compatible software, they take up a large space, thereby extremely narrowing the work space on a desk.

SUMMARY OF THE INVENTION

It is an object of the invention to provide a multi-monitor, auxiliary monitor, and monitor supporter which have overcome the problems residing in the prior art.

According to an aspect of the invention, a multi-monitor comprises: a first display device having a display screen; and a second display device having a display screen smaller than the first display device; and a supporting mechanism which is mountable on an outside portion of the first display device, and supports the second display device rotatably about a first axis and a second axis intersecting the first axis.

According to another aspect of the invention, an auxiliary monitor comprises: a main body having a display screen; and a supporting mechanism which is mountable on an outside portion of a mother monitor having a display screen larger than that of the main body, and supports the main body rotatably about a first axis and a second axis intersecting the first axis.

According to still another aspect of the invention, a monitor supporter comprises: a first support member for supporting an auxiliary display device rotatably about a first axis and a second axis intersecting the first axis; and a second support member which is mountable on an outside portion of a mother display device having a larger display screen than that of the auxiliary display device, and supports the first support member.

These and other objects, features and advantages of the invention will become more apparent upon a reading of the following detailed description and accompanying drawings.

Figure 1:
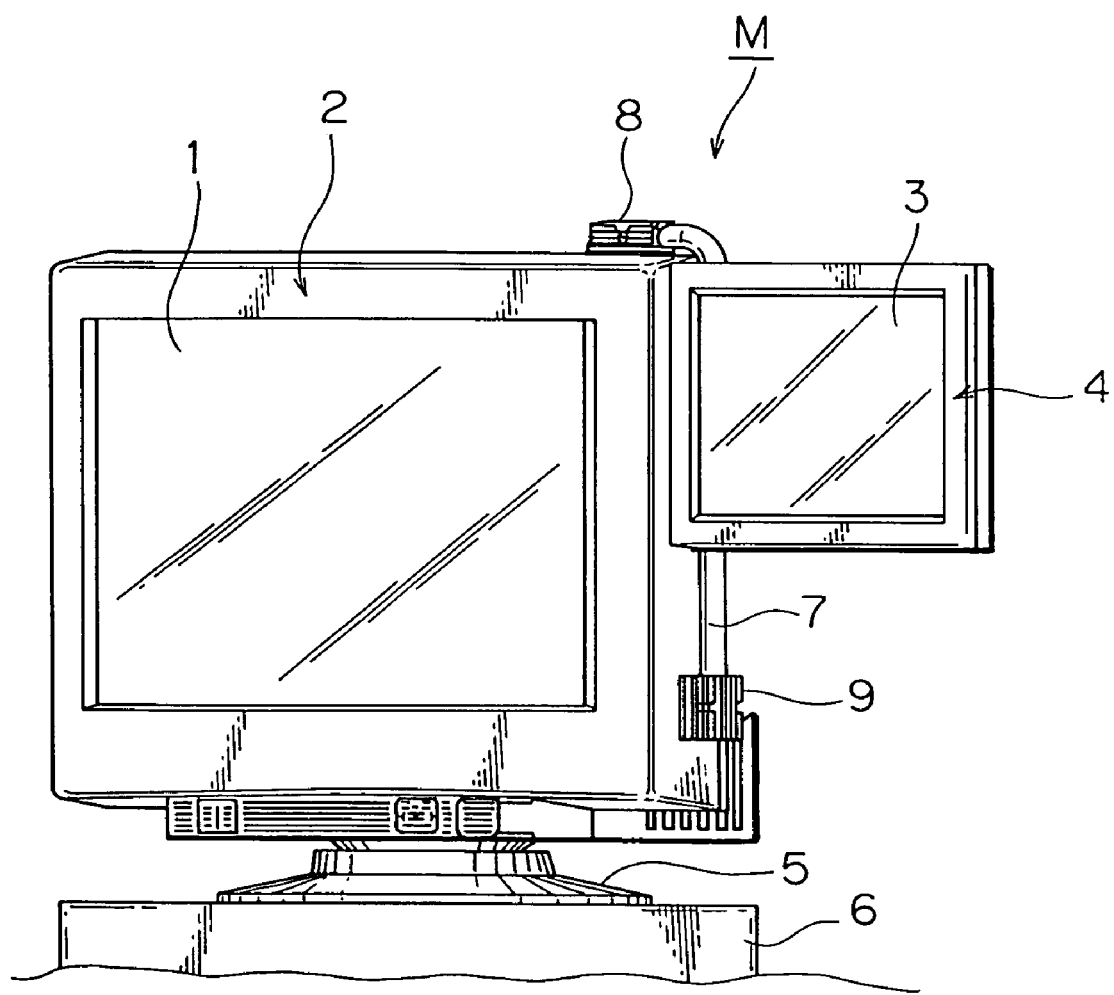
FIG. 1 is a front view showing a construction of a multi-monitor according to a first embodiment of the invention.
Figure 2:
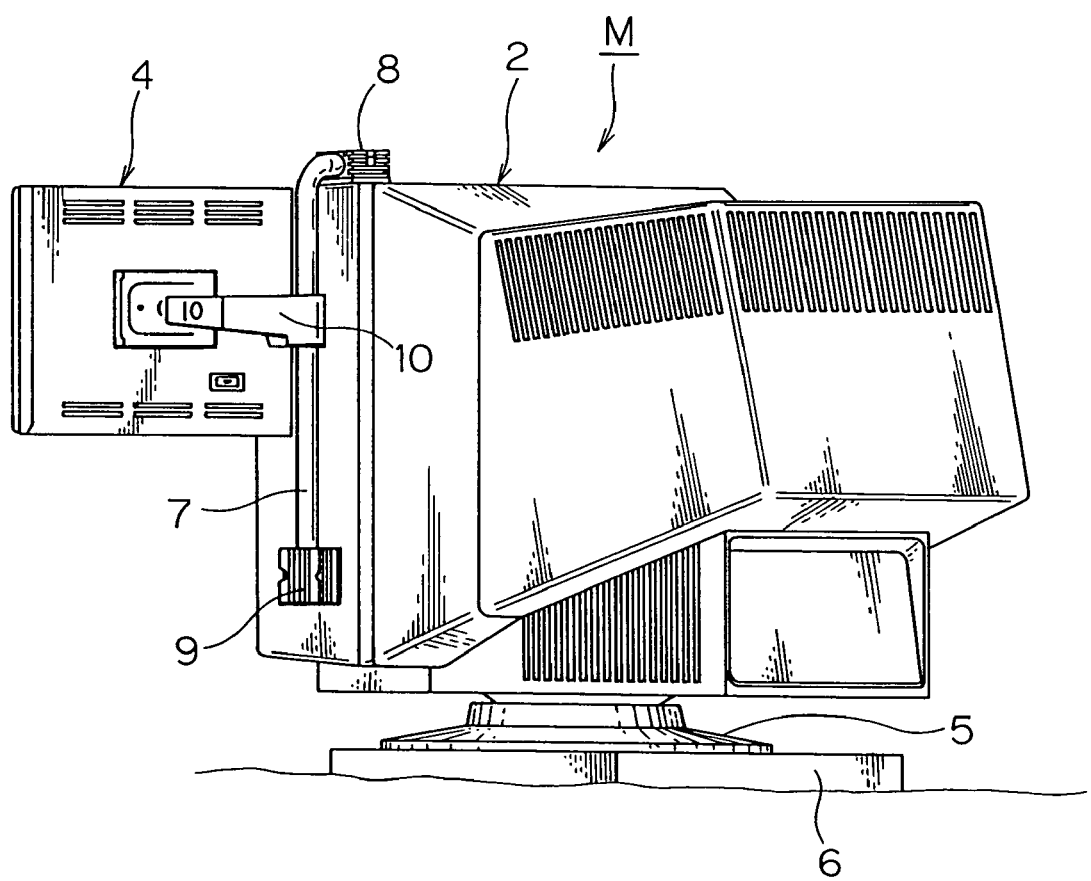
FIG. 2 is a perspective view of the first multi-monitor when viewed from behind.
Figure 3:
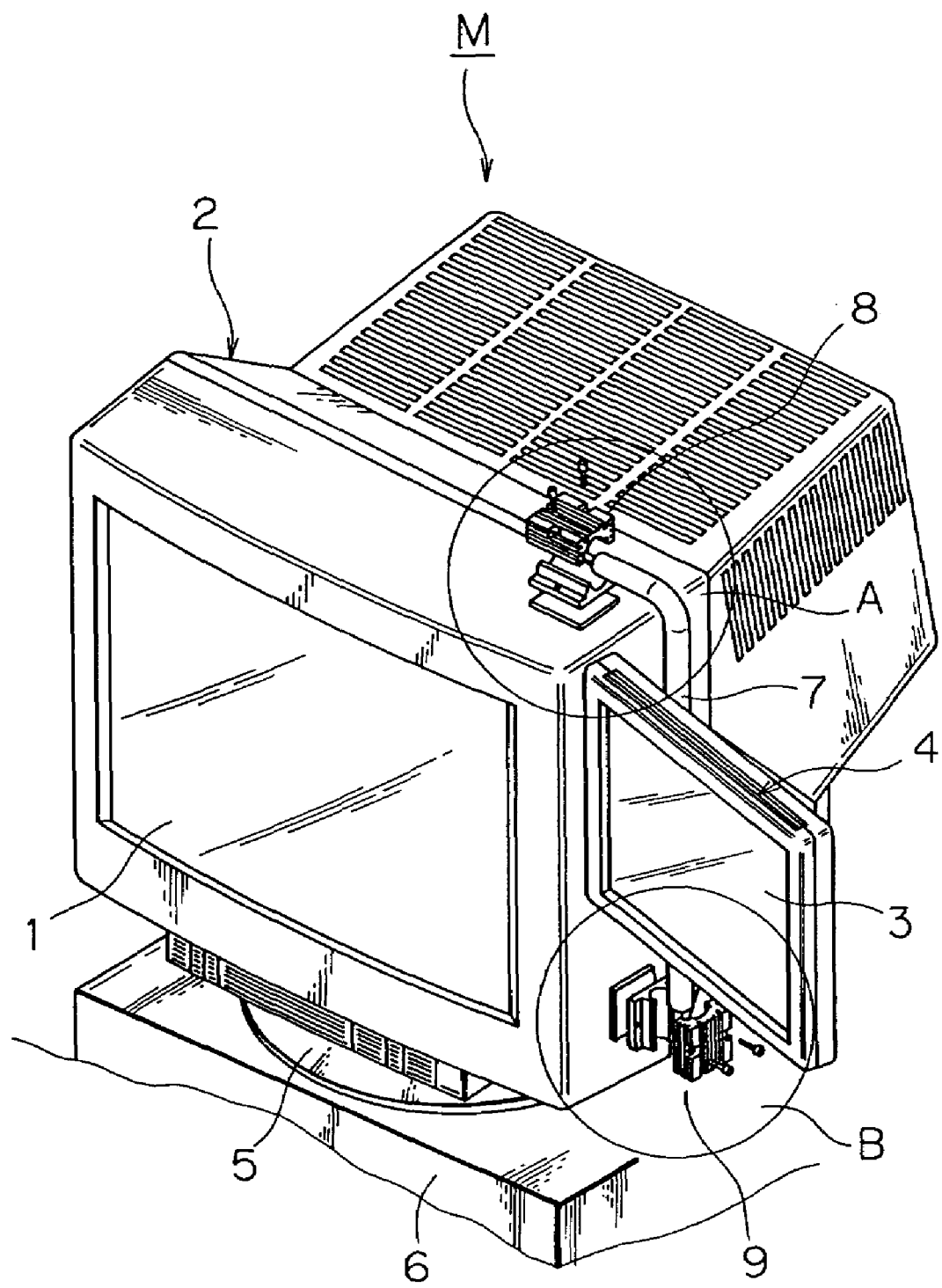
FIG. 3 is a perspective view of the first multi-monitor when viewed obliquely from above.

DETAILED DESCRIPTION OF THE
PREFERRED EMBODIMENTS OF THE
INVENTION

A first embodiment of the present invention will be described with reference to FIGS. 1 to 7.

A multi-monitor M is constructed by a liquid crystal display 4 (for example, a color STN liquid crystal display having a diagonal dimension of 10.4" and a resolution of SVGA (800 dots×600 dots) as a second display device having a small display screen 3 in addition to a CRT display 2 (for example, having a diagonal dimension of 17" and a resolution of XGA (1024 dots×768 dots) as a first display device having a large display screen 1. Alternatively, a liquid crystal display of the active matrix system represented by the TFT system may be used. A mount 5 is provided at the bottom of the CRT display 2.

Indicated at 6 is a computer main body, which is normally placed on a desk. If the computer main body 6 is box-shaped, the CRT display 2 is placed thereon.

Windows 98 (trademark) is, for example, installed as an operating system in the computer main body 6, and two video cards may be additionally mounted. One video card corresponds to the CRT display 2, whereas the other video card corresponds to the liquid crystal display 4.

Image signals representing images to be displayed which are outputted from the video cards are normally analog signals. However, special signals need to be inputted so as to be displayed on the liquid crystal display 4. In order to cope with such a difference in interface, the liquid crystal display 4 is internally provided with a circuit board for converting an analog signal into a digital signal. Instead of such a circuit board, the video card itself may have the same function as the above signal converting circuit. In this case, the circuit board can be dispensed with.

Next, a mounting structure of the liquid crystal display 4 on the CRT display 2 is described.

Indicated at 7 is a round tubular or cylindrical bracket arranged along one side end of the CRT display 2, by 8 a fixing block provided at one end of the upper surface of the CRT 2, and by 9 a fixing block provided at one side surface of the CRT display 2. The fixing blocks 8, 9 fix the opposite ends of the bracket 7.

An arm 10 is rotatably mounted on the bracket 7, and the free end of the arm 10 is secured to the rear surface of the liquid crystal display 4.

The arm 10, the bracket 7 and the fixing blocks 8, 9 may be made of a metal such as aluminum. In order to make them more lightweight, they may be made of a resin material such as acrylonitrile butadiene styrene (ABS) or polycarbonate. These parts weigh below 2 to 3 Kg in total.

Figure 4:
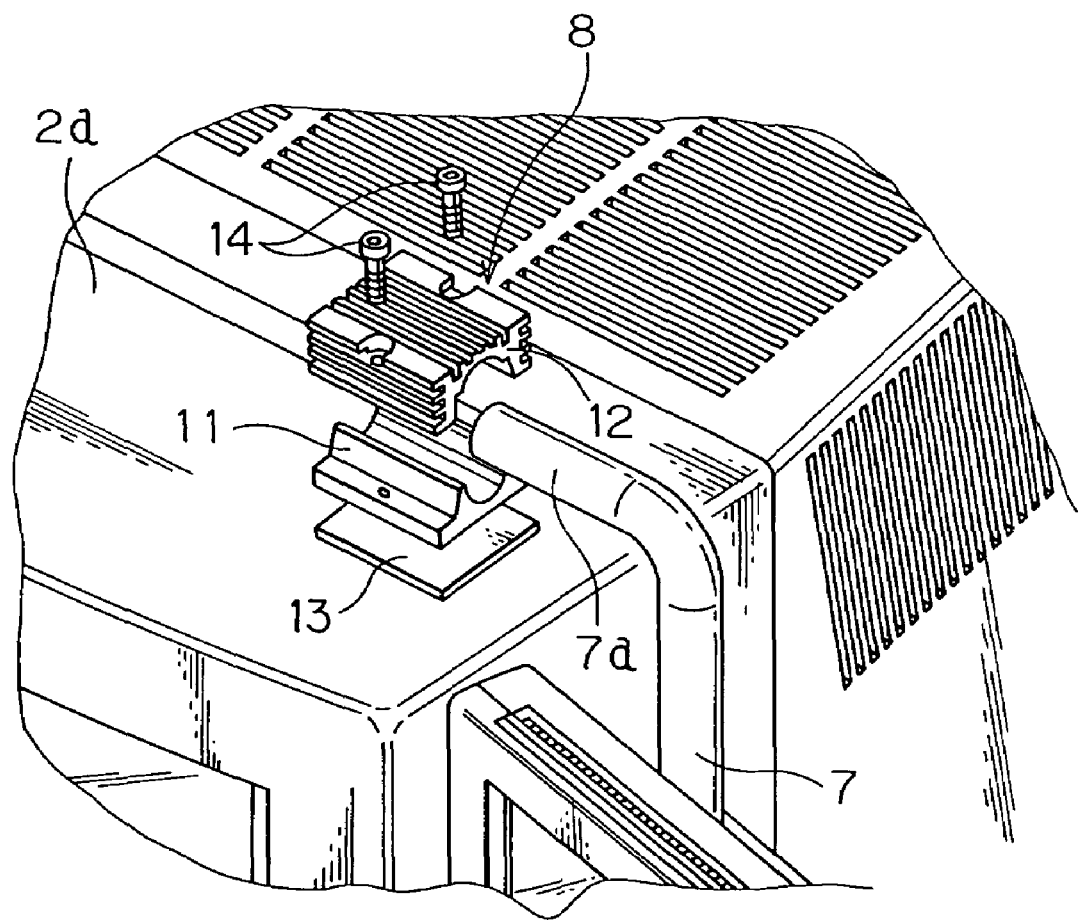
FIG. 4 is a perspective view of a section A in FIG. 3.
Figure 5:
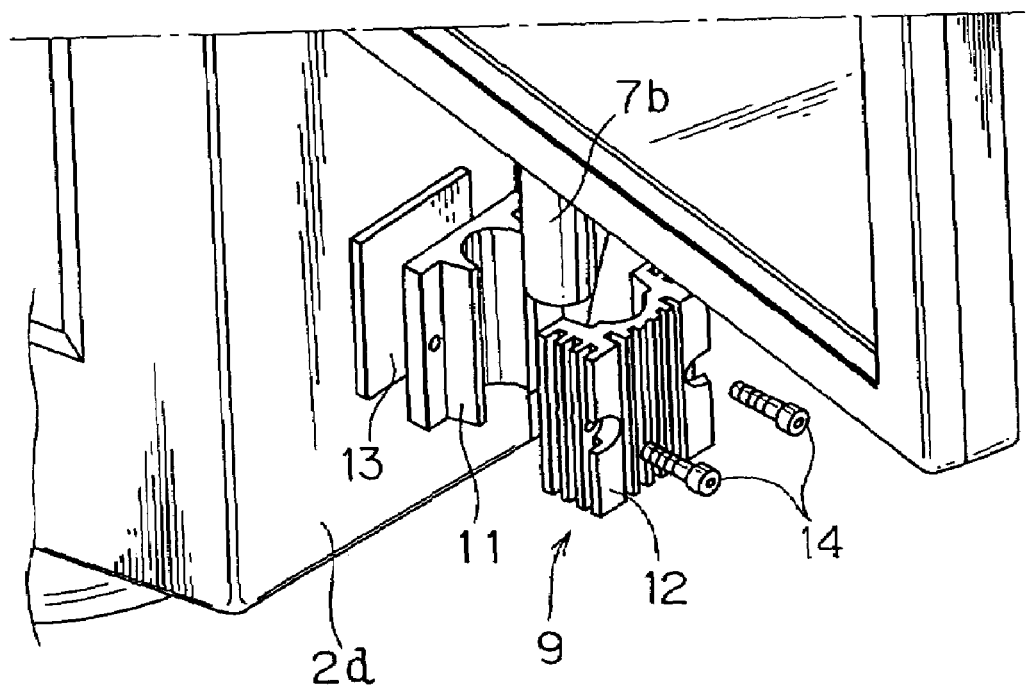
FIG. 5 is a perspective view of a section B in FIG. 3.

According to a fixing construction for the bracket 7 shown in FIGS. 4 and 5, the fixing blocks 8, 9 are each comprised of a base member 11 and a locking member 12, and the base members 11 are adhered to the upper and side surfaces of a casing 2a of the CRT display 2 by adhesive double coated tapes 13.

The opposite ends (fixing portions 7a, 7b) of the bracket 7 are placed on the base members 11 fixed by the tapes 13, and the locking members 12 are placed thereon. Subsequently, each base member 11 and each locking member 12 are fastened by two screws 14, thereby fixing the bracket 7.

The tapes 13 have a sufficient adhesive strength, but should be easily detachable by inserting a thin blade such as a cutter into clearances between the upper and side surfaces of the casing 2a and the base members 11 when the base members 11 are to be detached. To this end, double coated tapes made of acrylic foam having a thickness of about 1 to 3 mm may be used. Alternatively, a thin film fastener made of polyester elastomer which is produced by Sumitomo 3M and called "Mating Surface Fastener" may be used.

Figure 6:
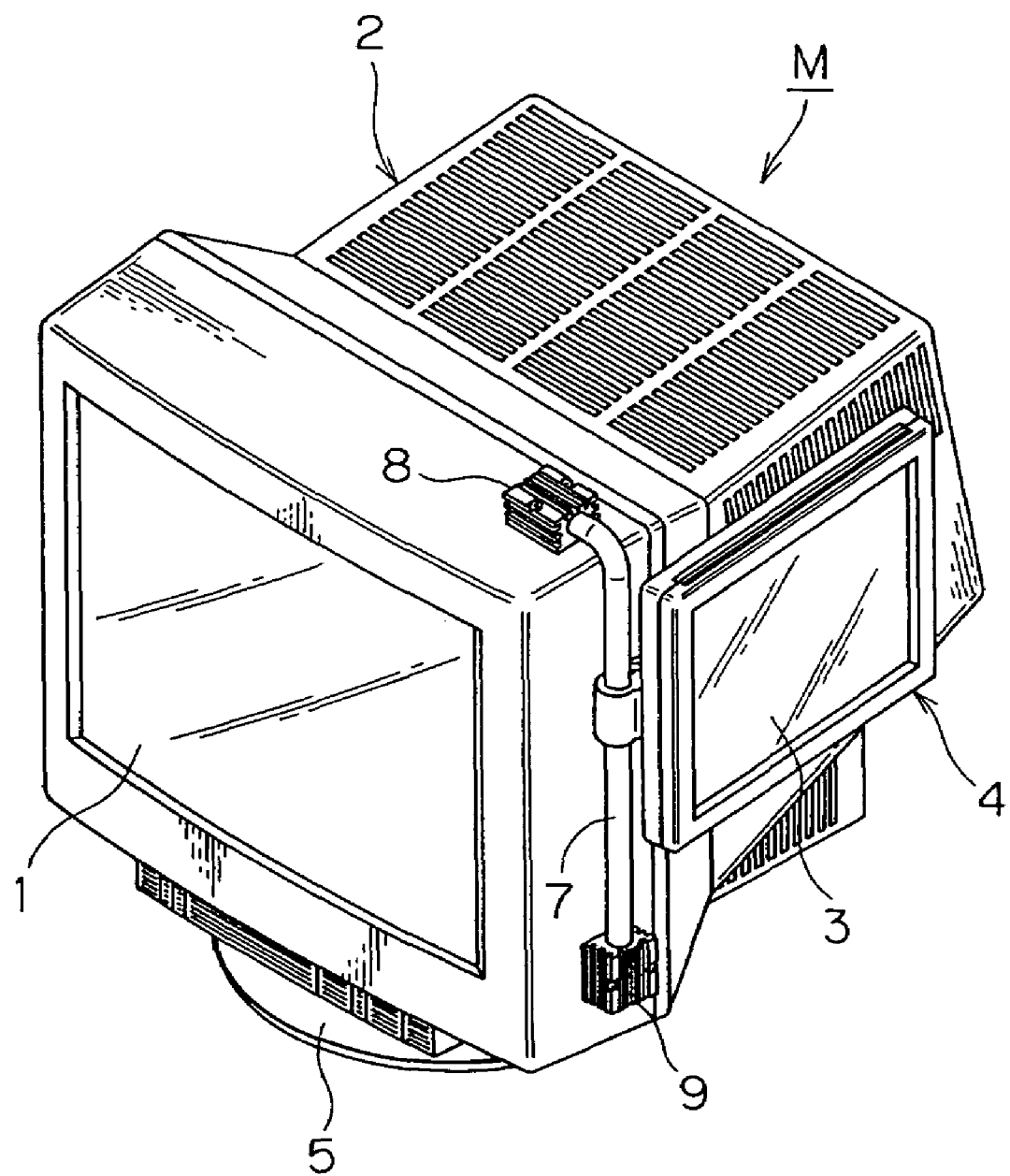
FIG. 6 is a perspective view of the first multi-monitor with a liquid crystal display held in its inoperative position when viewed obliquely from above.

In the multi-monitor M constructed as above, the fixing portions 7a, 7b of the bracket 7 can be set at desired positions on the upper and side surfaces of the casing 2a of the CRT display 2, and the arm 10 can be fixed at an optimal position of the bracket 7 along its longitudinal direction. Accordingly, the liquid crystal display 4 can be arranged to ensure an optimal working state or visibility for a user. If the use of the liquid crystal display 4 is not necessary, it may be kept in an inoperative position as shown in FIG. 6.

According to the inventive multi-monitor M, the work space on the desk can be remarkably increased by arranging the liquid crystal display 4 on the side surface of the casing 2a of the CRT display 2 and driving the liquid crystal display 4 and the CRT display 2 by the same operating system. Particularly, a space defined below the liquid crystal display 4 can be effectively used.

Figure 7:
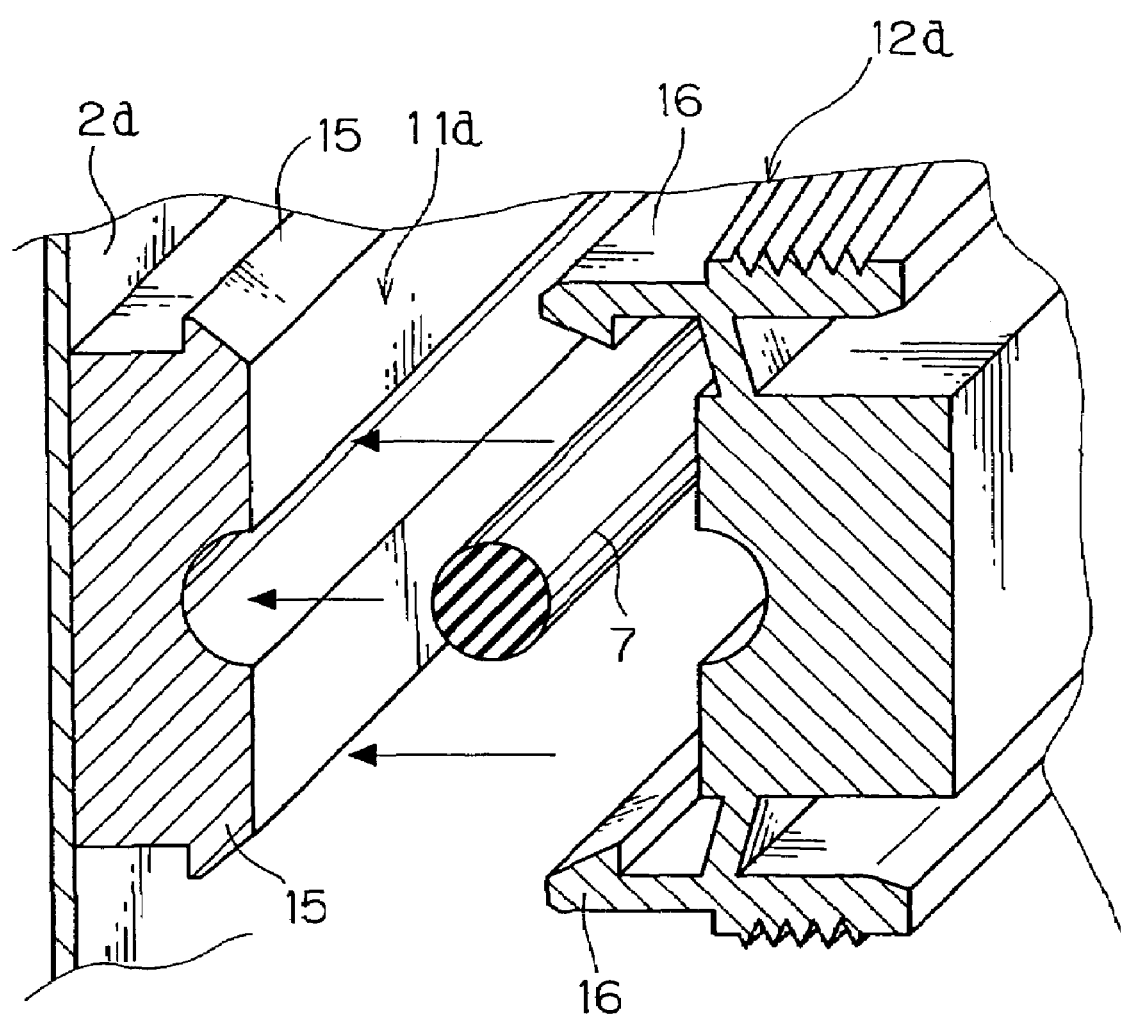
FIG. 7 is a perspective view partly in section showing a modification of a mount for a flat panel in the first embodiment.
Figure 8A:
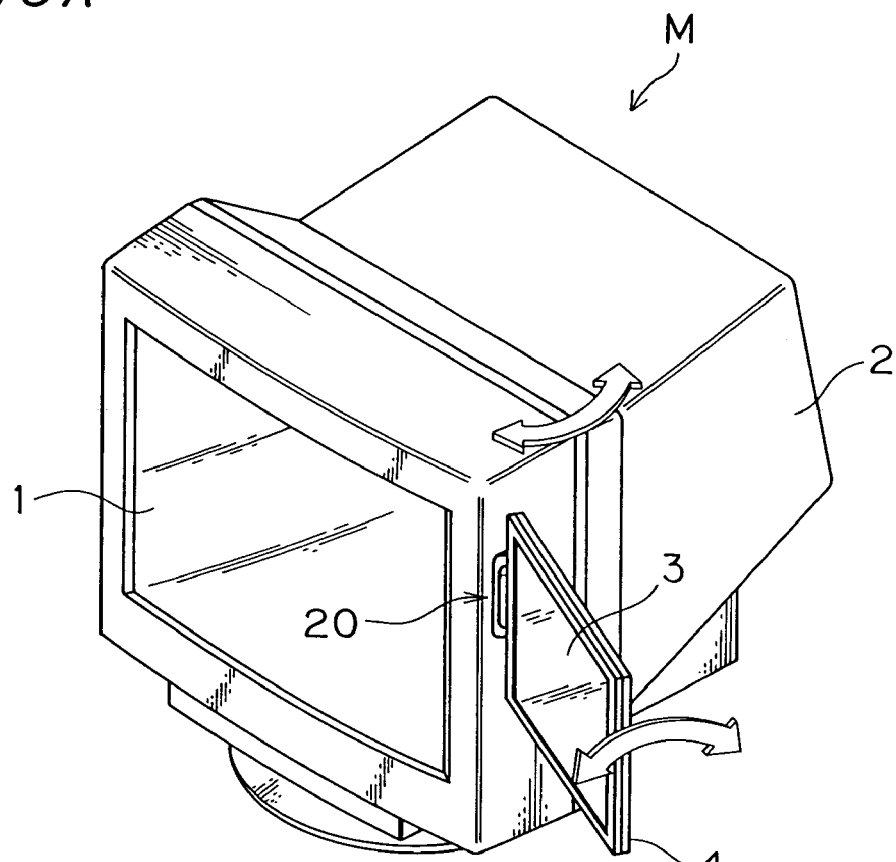
FIG. 8A is a perspective view of a multi-monitor according to a second embodiment of the invention when viewed obliquely from above at the front side.
Figure 8B:
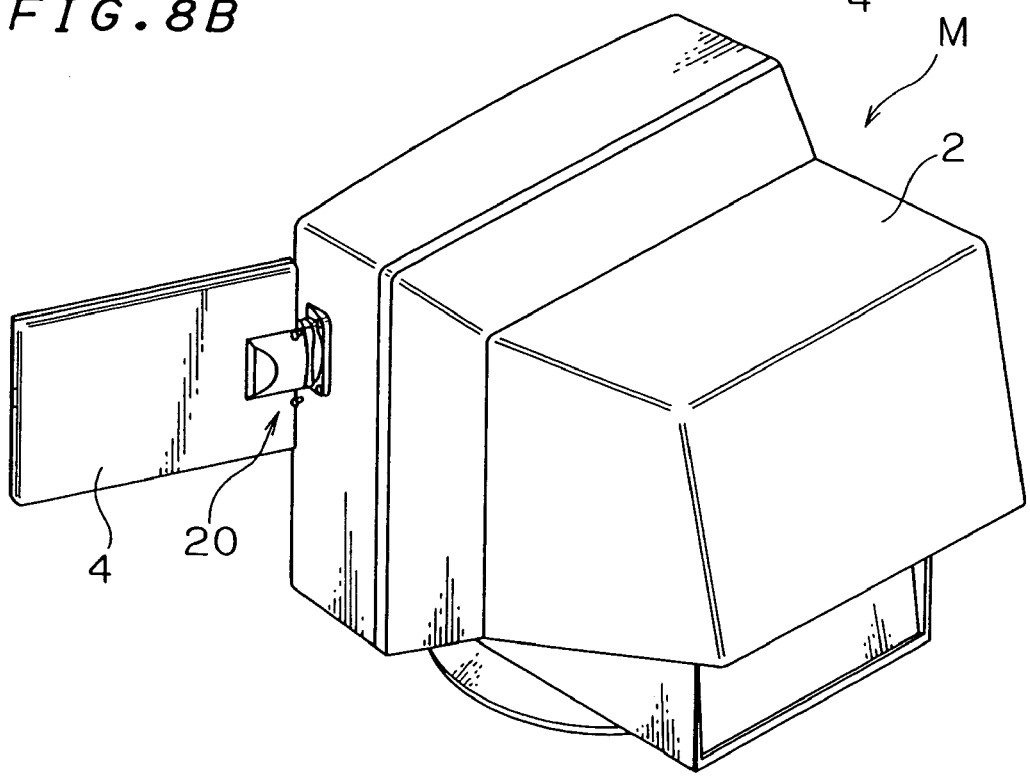
FIG. 8B is a perspective view of the second multi-monitor when viewed obliquely from above at the rear side.

Instead of securing the base members 11 by the adhesive double coated tapes 13, base members 11a may be fixed to the upper and side surfaces of the casing 2a as shown in FIG. 7 and locking members 12a may be so constructed as to be detachably engageable with the base members 11a. Specifically, each base member 11a and each locking member 12a are formed with jaw portions 15 and claw portions 16 for engagement, respectively. The bracket 7 is placed on the base member 11a and the locking member 12a is further placed thereon. The locking member 12a and the base member 11a are locked into each other and the bracket 7 is fixed therebetween by the engagement of the jaw portions 15 and the claw portions 16. Such a construction enables an easy detachment when the liquid crystal display 4 is not used.

Next, a working example of the multi-monitor M is described. With the development of the information transmission networks represented by Internet, the use of electronic mails has been spread. In a conventional single-monitor, an electronic mail screen needs to be called in a presently set operation screen in order to confirm the receipt of an electronic mail during the operation by a computer. Depending upon the software, the screen may be automatically switched to an electronic mail screen upon the receipt of an electronic mail during the operation. In such a case, there is a problem that the operation may be unnecessarily interrupted. If the mail is important, the operation may be interrupted. If the mail does not contain any urgent matter, this results in a reduced operation efficiency.

Contrary to this, if the inventive multi-monitor M is used, a received electronic mail can be displayed on the liquid crystal display 4 to enable a user to confirm the importance and urgency and to grasp the content. This eliminates an unnecessary interruption of the operation, thereby remarkably improving the operation efficiency.

Although the base members 11, 11a are fixed by the adhesive double coated tapes 13, or the like in the first embodiment, magnetic base members may be fixed to a metal casing instead. This enables the base members to be more easily and freely fixed at desired positions.

In the first embodiment, the liquid crystal display 4 of the multi-monitor M is constructed such that the height thereof and the facing direction thereof about the vertical axis are adjustable.

Next, a second embodiment will be described with reference to FIGS. 8A to 12E. In the second embodiment, the height of the liquid crystal display is fixed, whereas the facing direction of a liquid crystal display can be set at any desired direction. More specifically, the facing direction of a liquid crystal display is adjustable horizontally about a vertical axis, vertically about a horizontal axis, and in oblique directions.

Figure 9A:
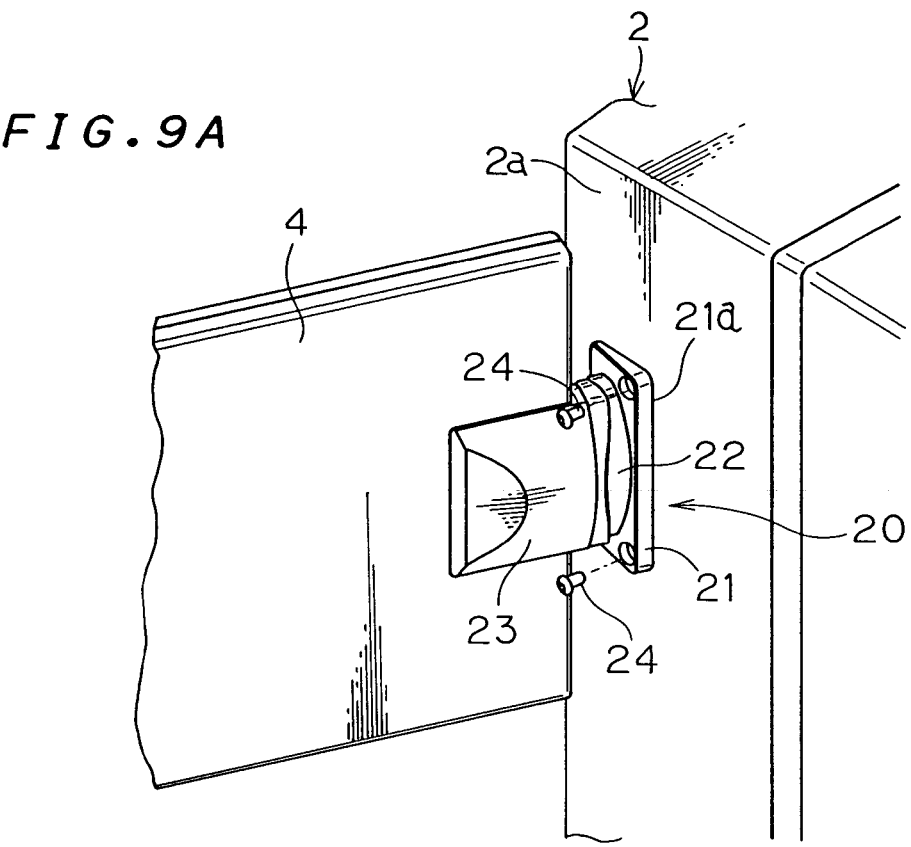
FIG. 9A is a perspective view of a supporting mechanism of a liquid crystal display of the second multi-monitor when viewed obliquely from above at the rear side.
Figure 9B:
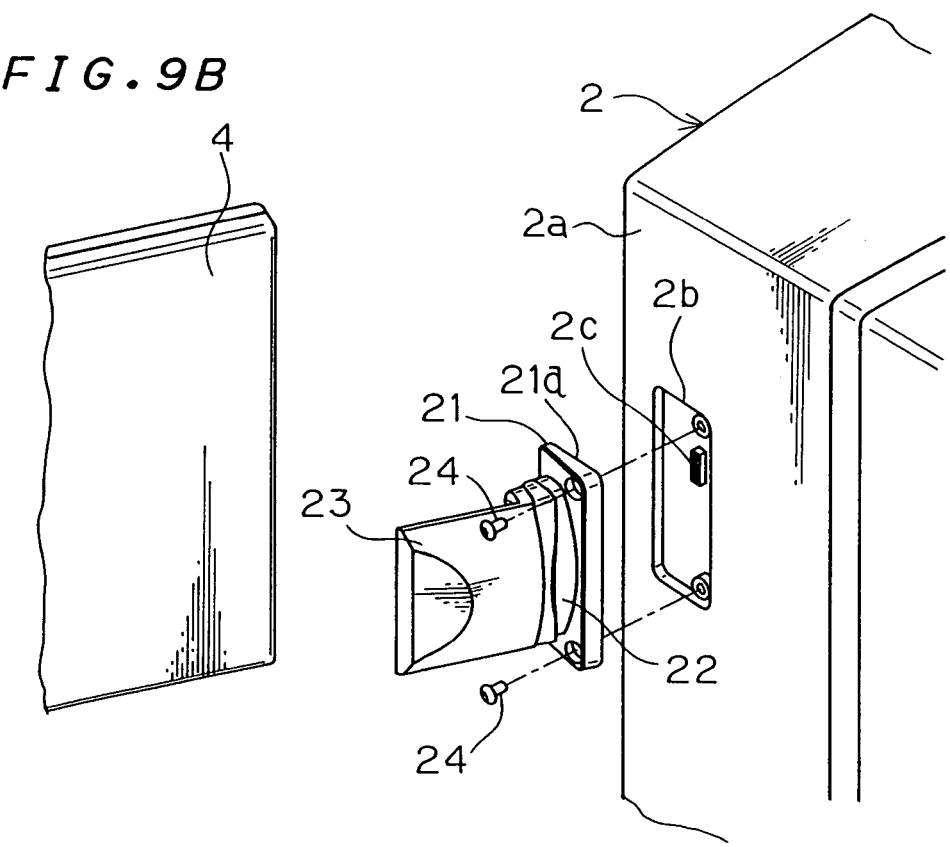
FIG. 9B is an exploded perspective view of the supporting mechanism.

A liquid crystal display 4 is mounted in a recess 2b formed in the left side surface of the casing 2a of the CRT display 2 via a supporting mechanism 20. The supporting mechanism 20 is comprised of an inner bracket 21 to be mounted on the CRT display 2, an intermediate support block 22, and an outer bracket 23 to be mounted on the liquid crystal display 4 as shown in FIGS. 9A and 9B. The supporting mechanism 20 assembled as shown in FIGS. 9A and 9B is fixed by screws 24 after fitting a part of the inner surface 21a of the inner bracket 21 into the recess 2b. The outer bracket 23 is comprised of a base portion 23a and a leading portion 23b and has an L-shaped cross-section. The outer bracket 23 is mounted by disposing the base portion 23a so as to be in contact with the intermediate support block 22, and by adhering the rear surface of the liquid crystal display 4 to the leading end 23b by adhesive or the like.

Figure 10A:
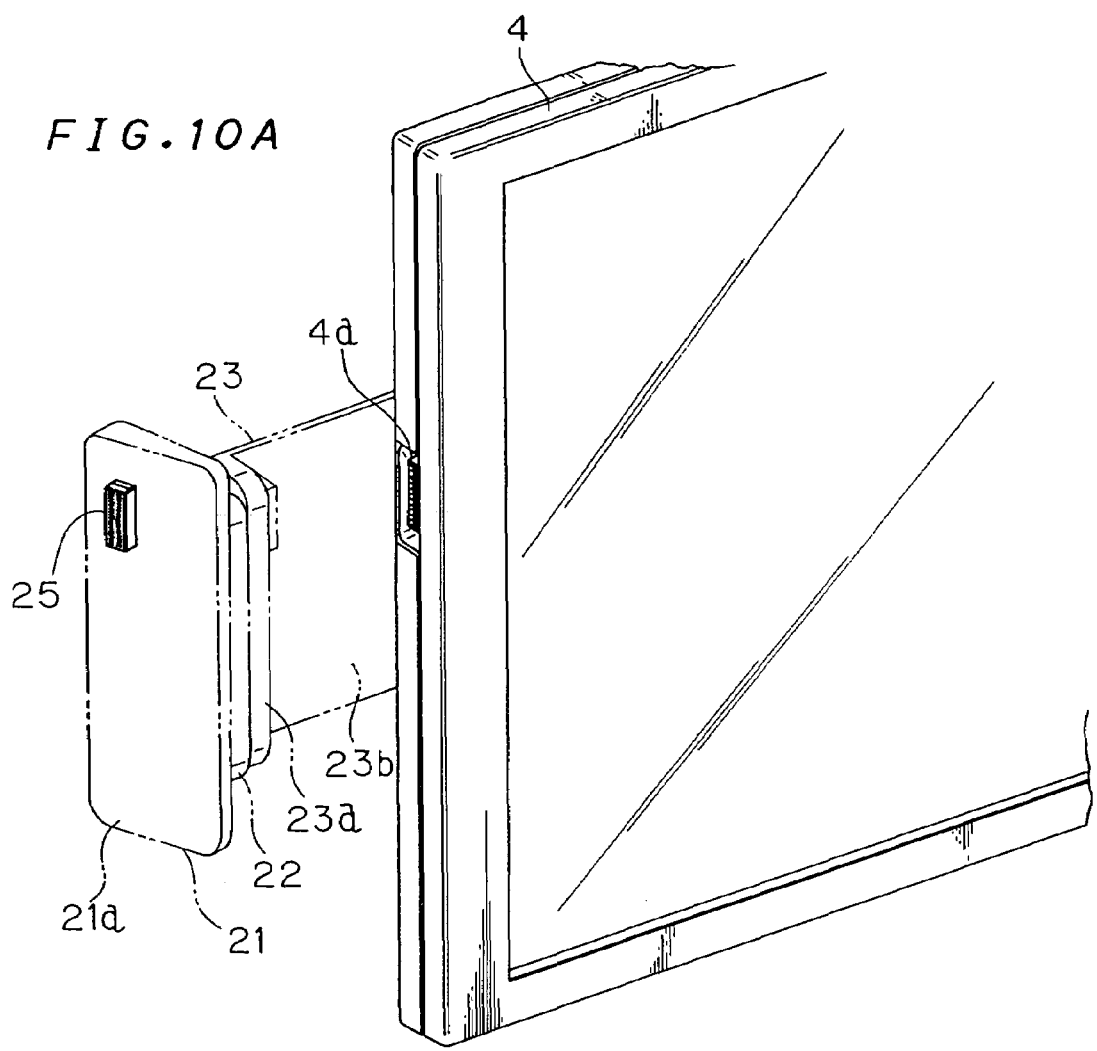
FIG. 10A is a perspective showing connectors provided in the supporting mechanism and the liquid crystal display of the second multi-monitor.
Figure 10B:
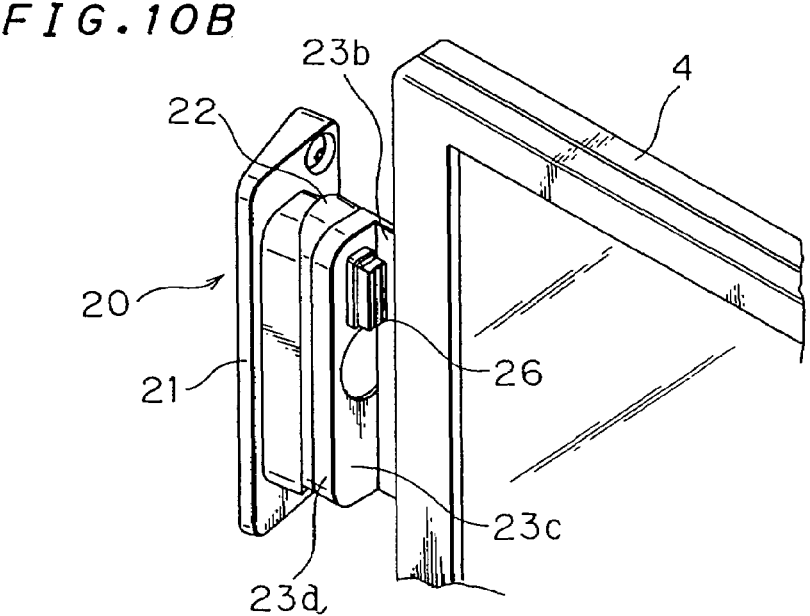
FIG. 10B is another connector provided in the supporting mechanism.

A connector 2c is provided in the recess 2b of the CRT display 2, and a mating connector 25 provided in an inner surface 21a of the inner bracket 21 is connected with the connector 2c as shown in FIG. 10A. On the other hand, a connector 4a is provided in one side surface of the crystal display 4, and a mating connector 26 provided in an outer surface 23c of the base portion 23a of the outer bracket 23 is connected with the connector 4a as shown in FIG. 10B.

Figures 11A, 11B, 11C:
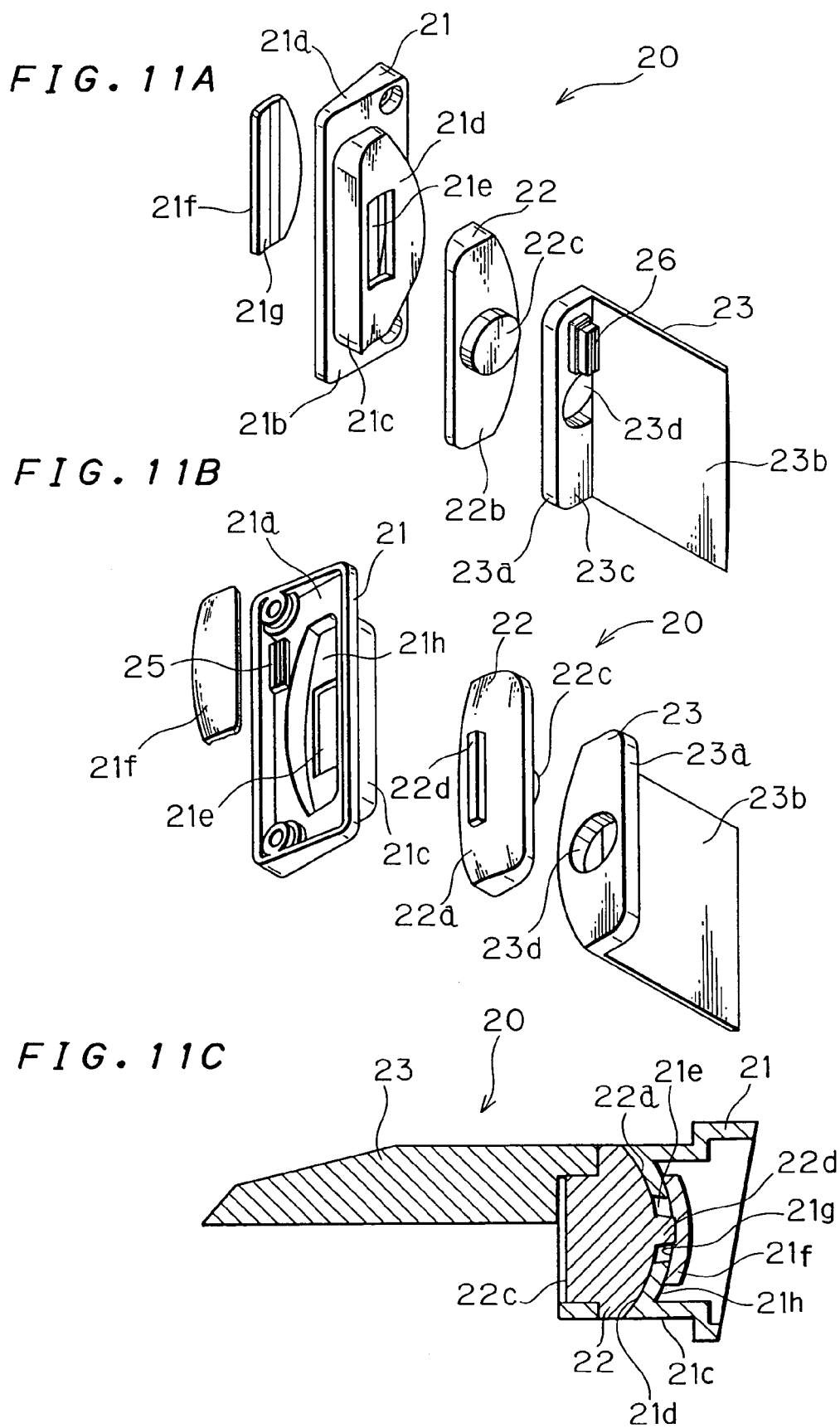
FIG. 11A is an exploded perspective view showing a construction of the supporting mechanism when viewed from a mount side on the liquid crystal display.
FIG. 11B is an exploded perspective view showing the construction of the supporting mechanism when viewed from a mount side on the CRT display.
FIG. 11C is a horizontally sectional view of the supporting mechanism.

As shown in FIGS. 11A to 11C, a projection 21c is formed on an outer surface 21b of the inner bracket 21, and a concave surface 21d arcuately recessed at the same radius of curvature from the top to the bottom is formed in the outer surface of the projection 21c toward the intermediate support block 22. An outer surface 22a of the intermediate support block 22 toward the inner bracket 21 is a convex surface arcuately projecting at the same radius of curvature as the concave surface 21d of the projection 21c from the top to the bottom. The concave and convex surfaces 21d, 22a are so formed as to have substantially the same area. An outer surface 22b of the intermediate support block 22 toward the outer bracket 23 is flat, and a cylindrical support shaft 22c is formed substantially in the center of the outer surface 22b. In the base portion 23a of the outer bracket 23 is formed a round through hole 23d having substantially the same radius as the cylindrical support shaft 22c. The convex surface 22a of the intermediate support block 22 is formed with a projection 22d. The concave surface 21d of the inner bracket 21 is formed with a through hole 21e.

The inner bracket 21, the intermediate support block 22 and the outer bracket 23 thus shaped are assembled as follows. The support shaft 22c of the intermediate support block 22 is inserted into the through hole 23d of the outer bracket 23, thereby bringing the concave surface 21d of the inner bracket 21 into direct contact with the convex surface 22a of the intermediate support block 22. The projection 22d of the intermediate support block 22 is inserted into the through hole 21e of the inner bracket 21. Thereafter, a curved support piece 21f is attached on a leading surface of the projection 22d by adhesive. Consequently, the three members 21, 22, and 23 are coupled to one another. As shown in FIG. 11C illustrating the coupled state, the curvature of a contact surface 21g of the curved support piece 21f is substantially the same as that of a surface 21h of the inner bracket 21 which is opposite to the concave surface 22a. The intermediate support block 22 and the outer bracket 23 are rotatable in forward and reverse directions about a vertical axis with respect to the inner bracket 21 via the convex and concave surfaces 22a and 21d, and the outer bracket 23 is rotatable in forward and reversed directions about a horizontal shaft with respect to the intermediate support block 22 via the support shaft 22c and the through hole 23d. The intermediate support block 22 is assuredly kept from disengaging from the inner bracket 21 by the curved support piece 21f.

Figure 12A:
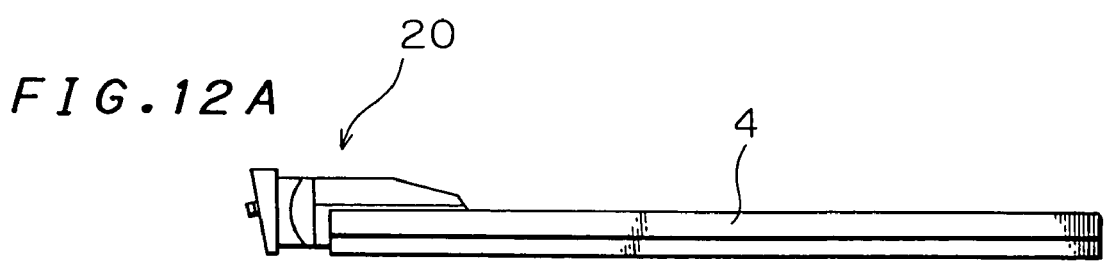
FIGS. 12A, 12B, 12C, 12D and 12E are plan views showing movements of the supporting mechanism of the second multi-monitor.
Figure 12B:
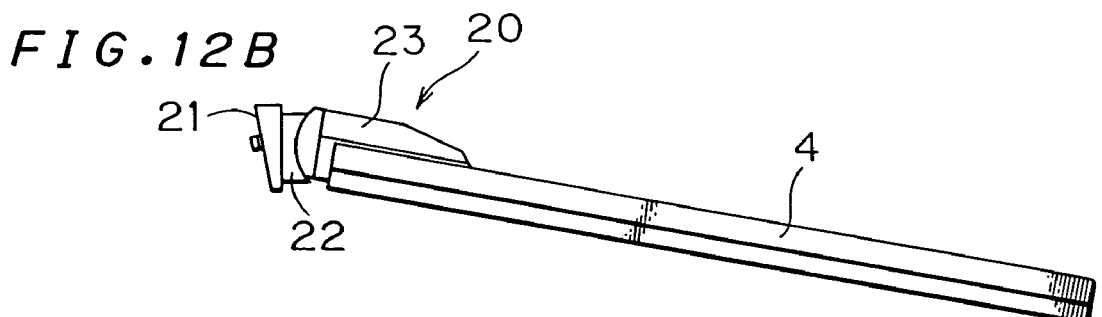
Figure 12C:
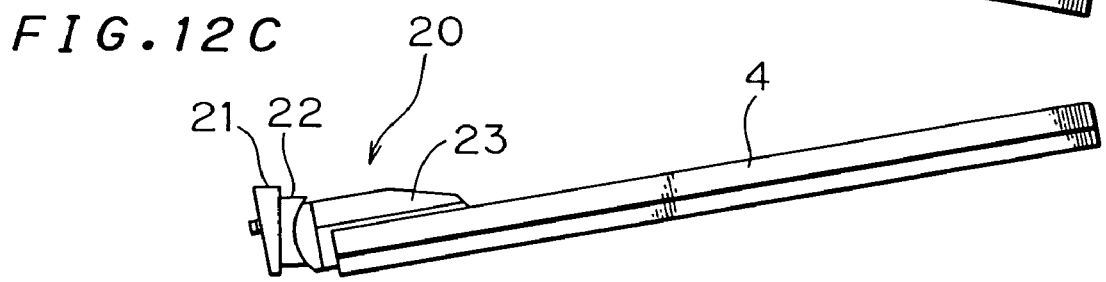
Figure 12D:
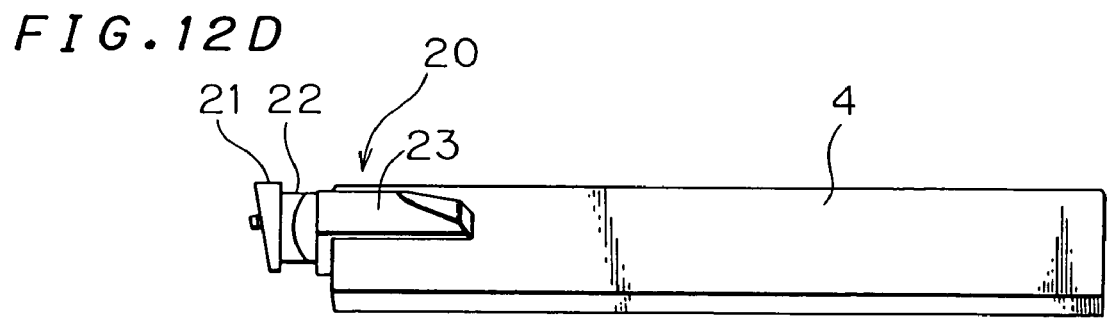
Figure 12E:
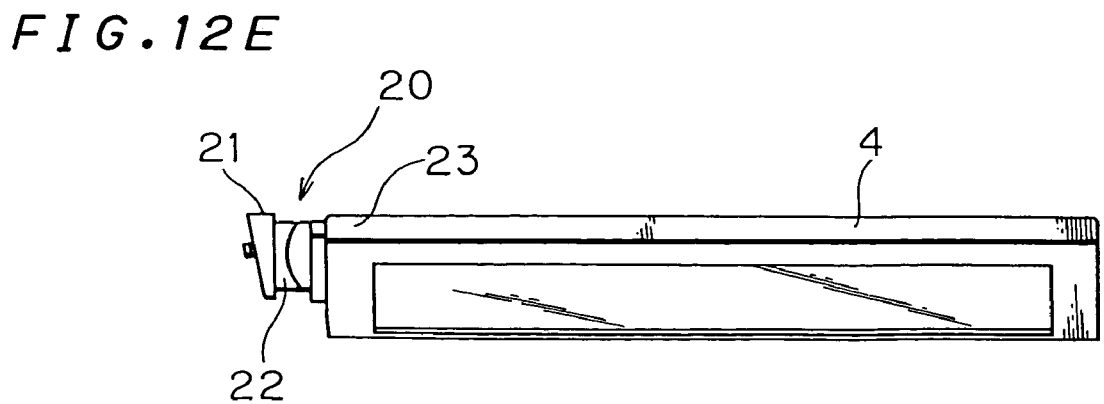

Accordingly, since the multi-monitor of the second embodiment has the supporting mechanism 20, the liquid crystal display 4 is horizontally pivotal to left and right positions shown in FIGS. 12B, 12C from a home position shown in FIG. 12A (FIGS. 12A to 12E are plan views) when the intermediate support block 22 and the outer bracket 23 are rotated about the vertical axis via the convex and concave surfaces 22a and 21d. Further, when the outer bracket 23 is rotated about the horizontal axis via the support shaft 22c and the through hole 23d, the liquid crystal display 4 is pivoted to upper and lower positions shown in FIGS. 12D and 12E from the home position of FIG. 12A. Furthermore, when the intermediate support block 22 and the outer bracket 23 are rotated about the vertical axis via the convex and concave surfaces 22a and 21d and the outer bracket 23 is rotated about the horizontal axis via the support shaft 22c and the through hole 23d, the liquid crystal display 4 can have its facing direction changed to any desired direction: vertical, horizontal, oblique directions.

Accordingly, even if the liquid crystal display 4 has such a viewing angle characteristic that it is easy or difficult to see depending upon a viewing angle, or it is hard to see due to an external light, the facing direction of the liquid crystal display 4 can be adjusted to an angle by the aforementioned supporting mechanism 20 where an operator can easily see. Further, an other operator having a different sitting height can adjust the orientation of the liquid crystal display 4 to an angle where he can easily see.

Figure 13A:
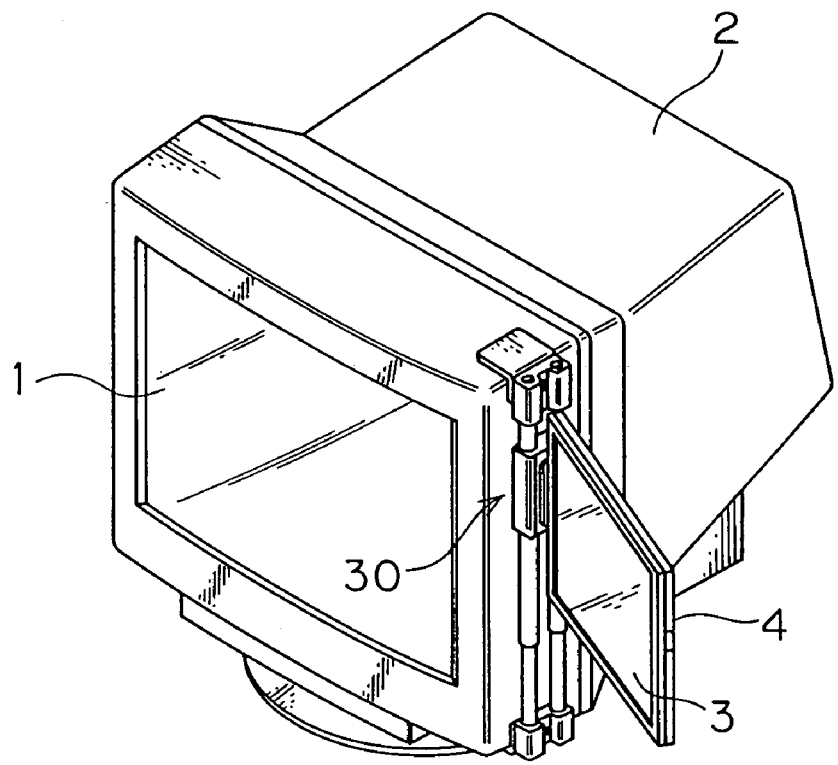
FIG. 13A is a perspective view of a multi-monitor according to a third embodiment when viewed obliquely from above at the front side.
Figure 13B:
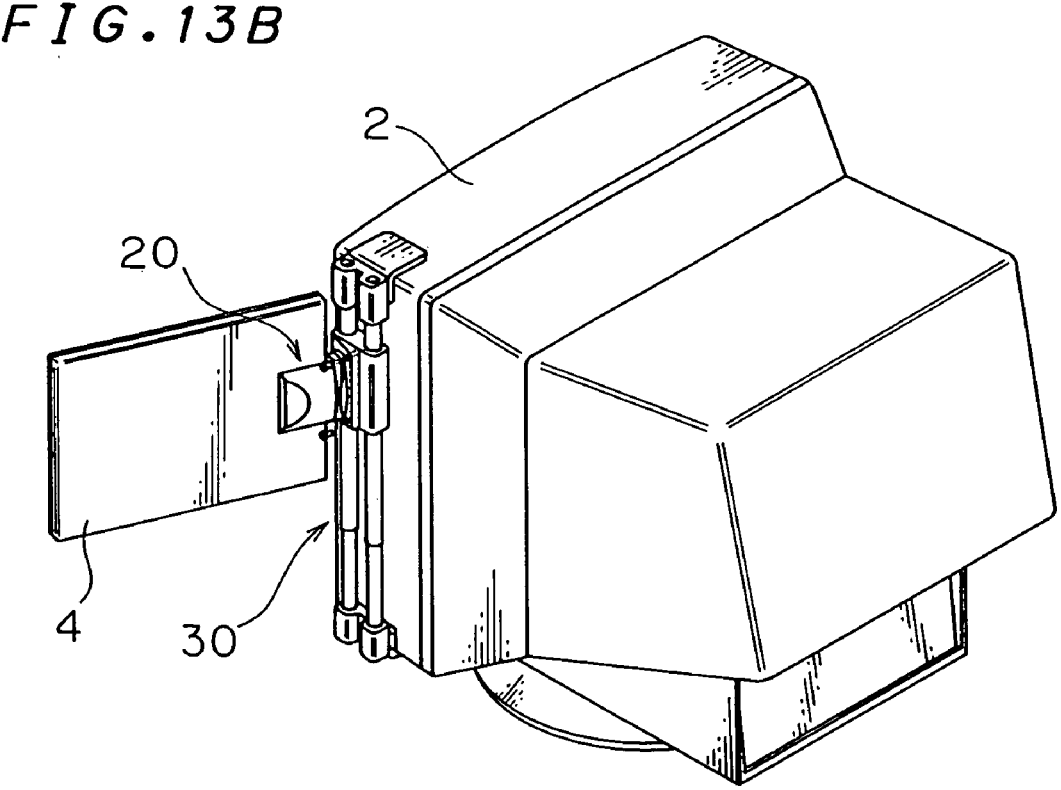
FIG. 13B is a perspective view of the third multi-monitor when viewed obliquely from above at the rear side.
Figure 14:
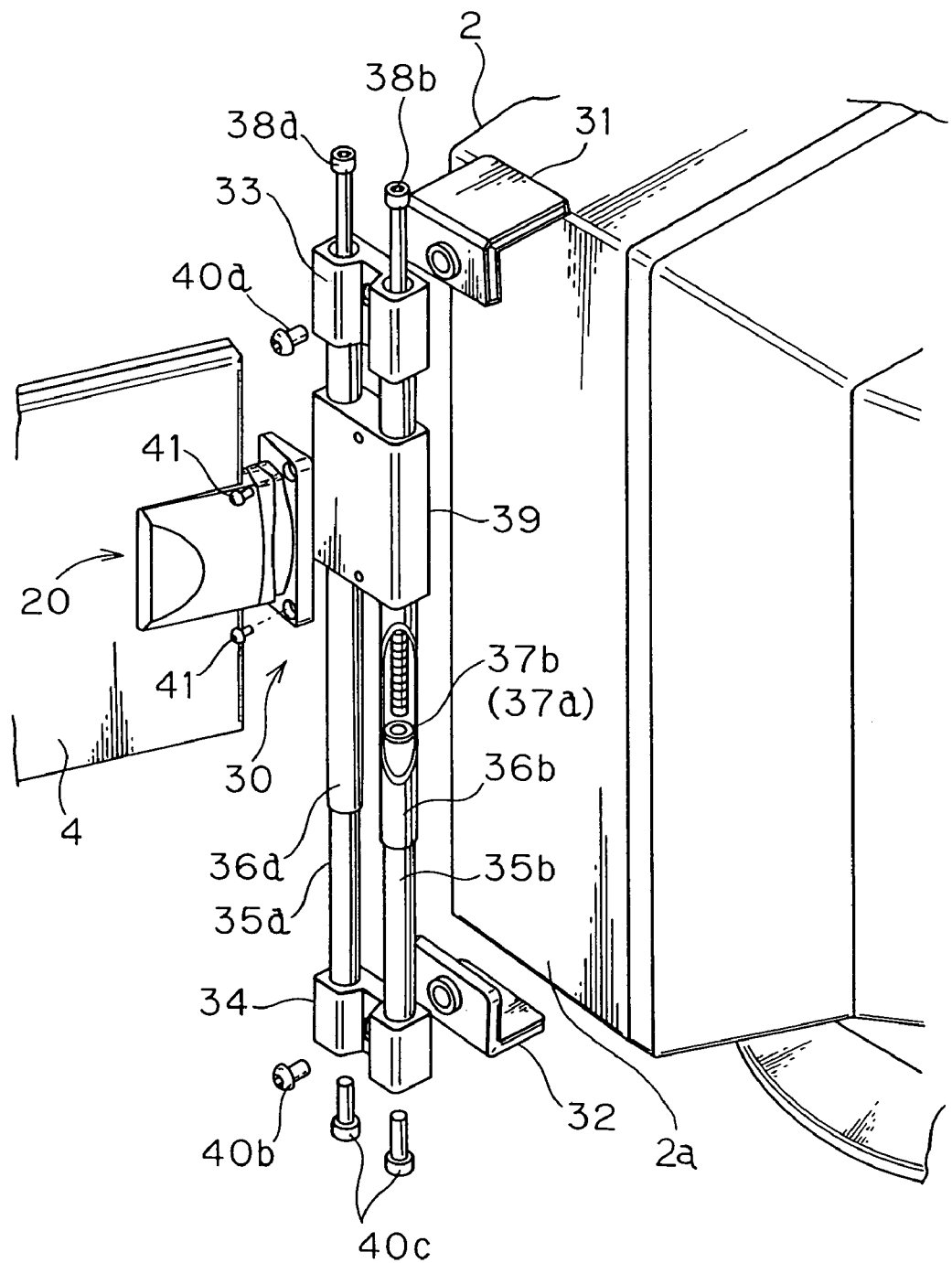
FIG. 14 is an exploded perspective view of a supporting mechanism of a liquid crystal display of the third multi-monitor when viewed obliquely from above at the rear side.
Figure 15A:
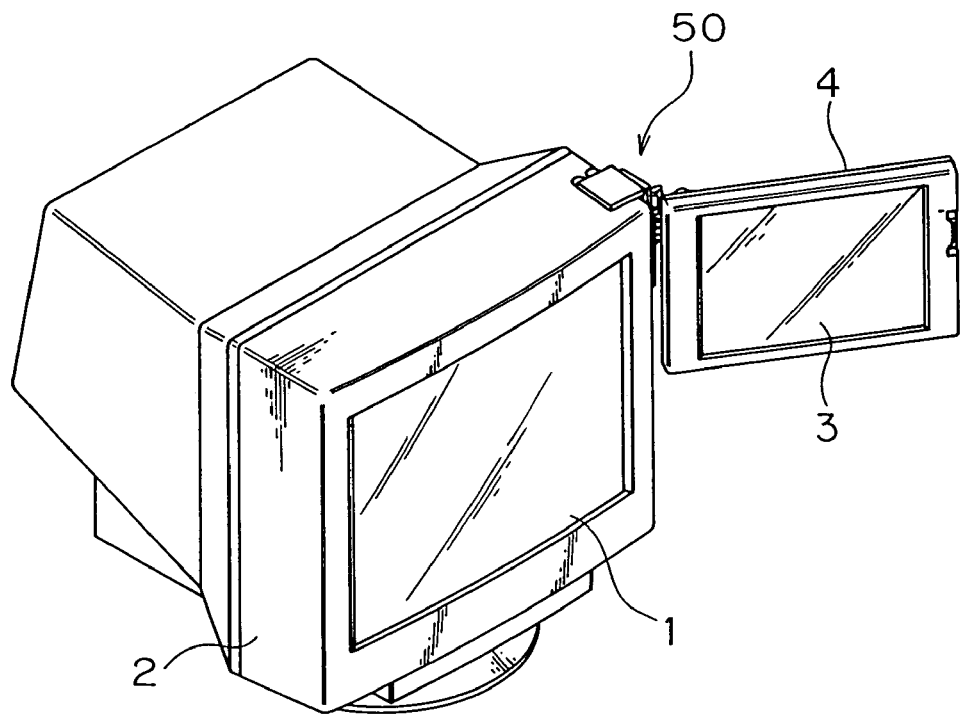
FIG. 15A is a perspective view of a multi-monitor according to a fourth embodiment when viewed obliquely from above at the front side.
Figure 15B:
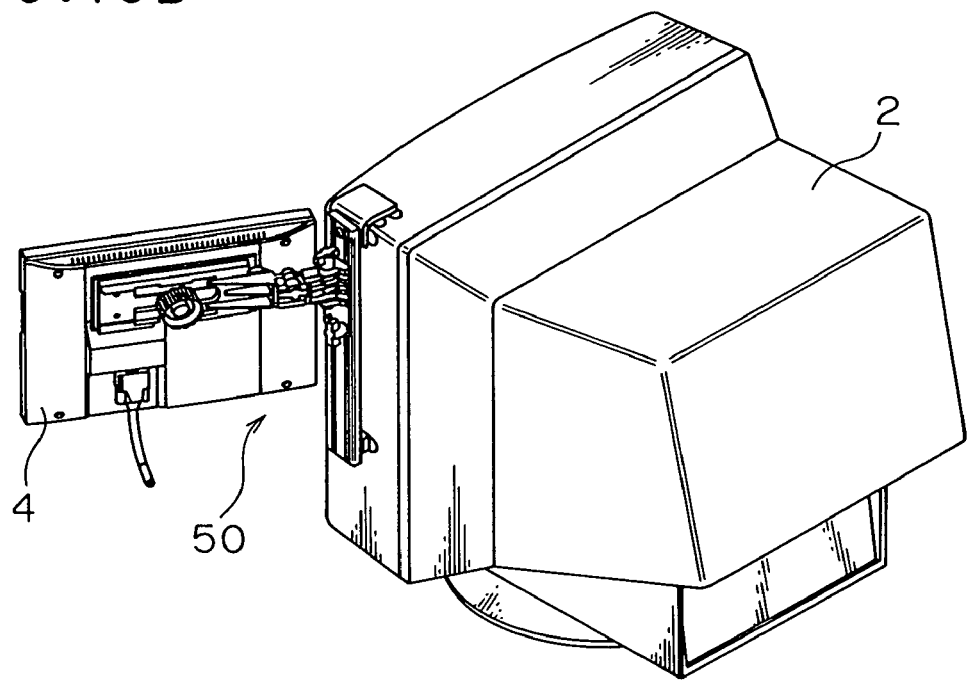
FIG. 15B is a perspective view of the fourth multi-monitor when viewed obliquely from above at the rear side.
Figure 16:
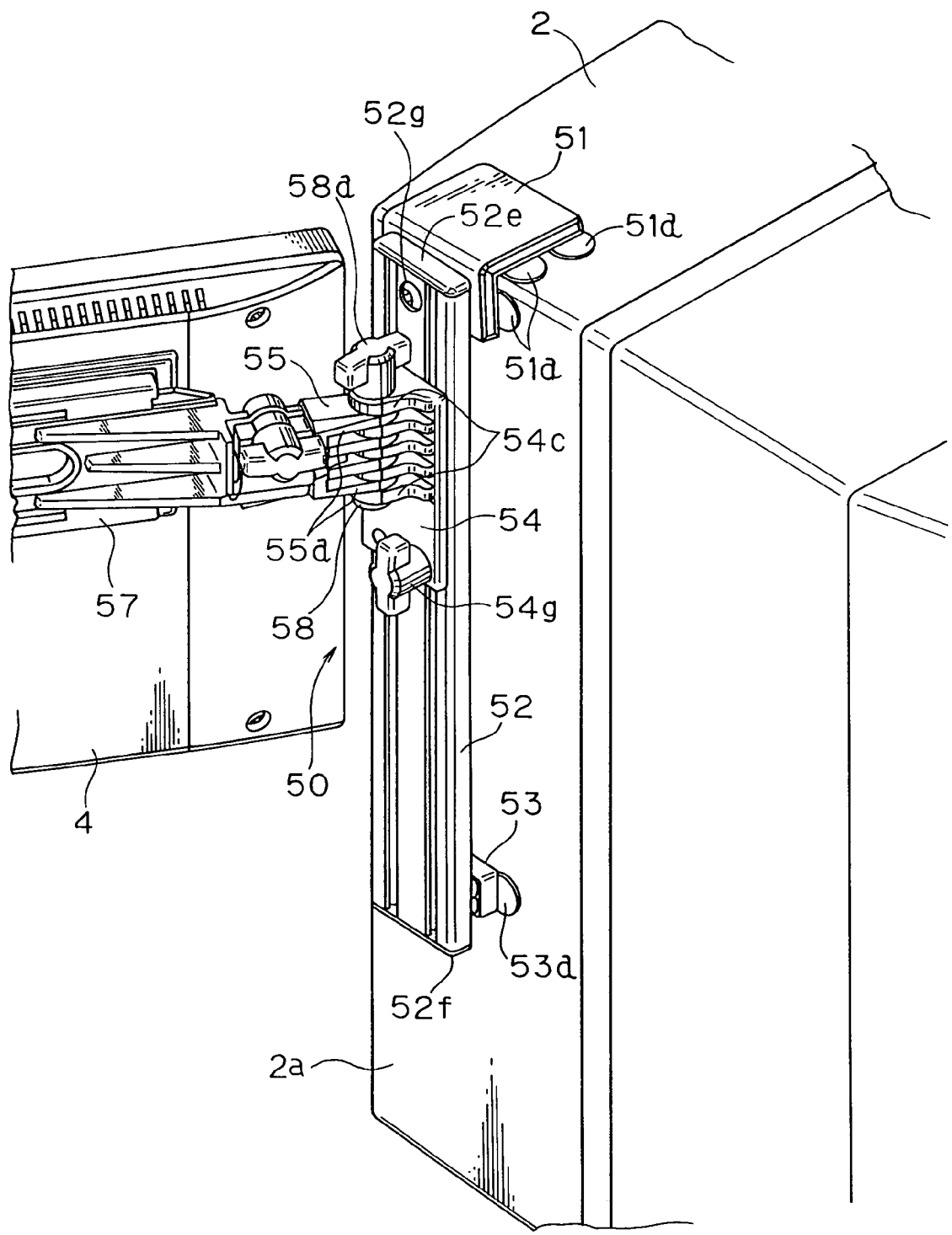
FIG. 16 is a perspective view of a supporting mechanism of a liquid crystal display of the fourth multi-monitor when viewed obliquely from above at the rear side.
Figure 17:
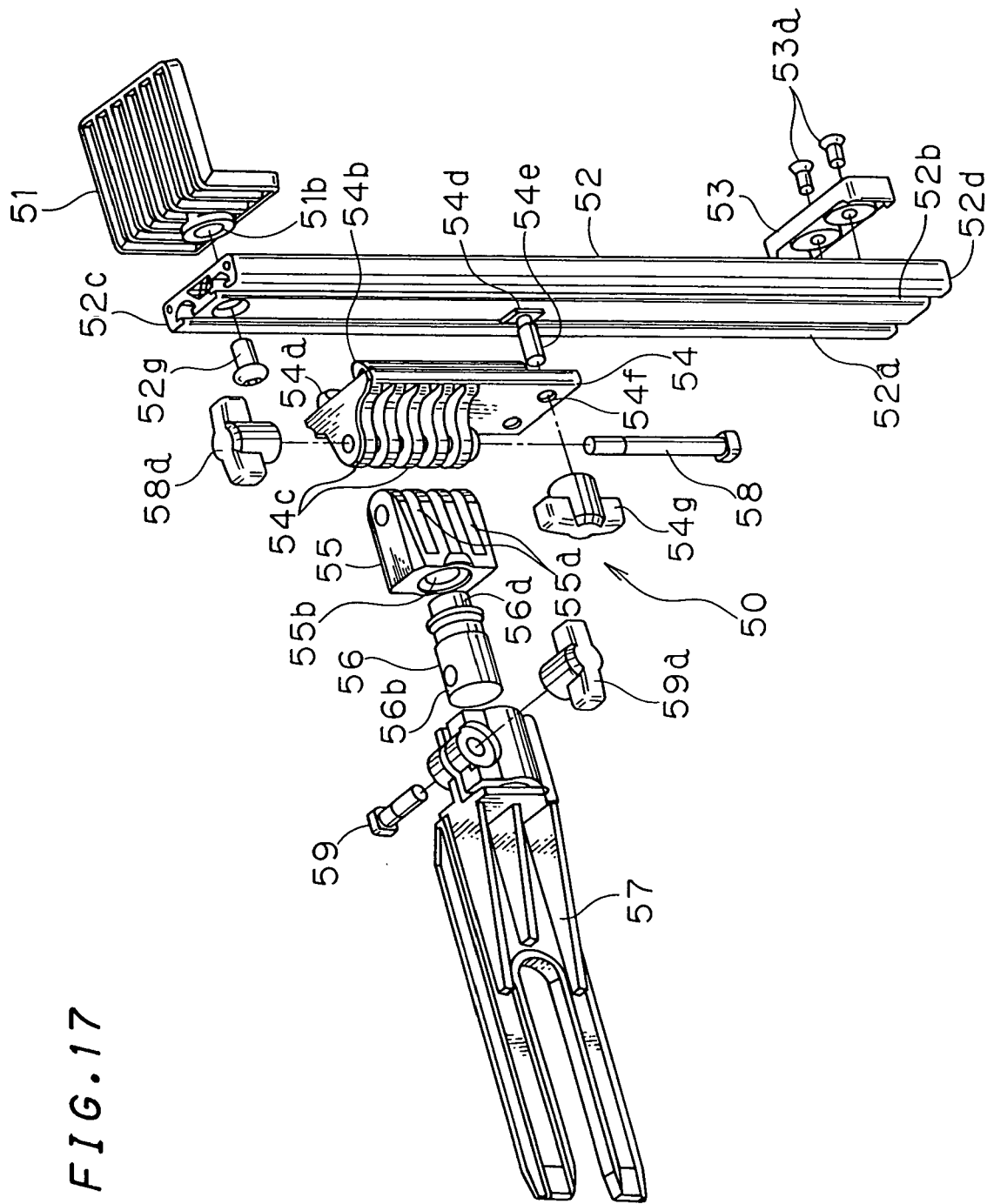
FIG. 17 is an exploded perspective view of the supporting mechanism of the liquid crystal display of the fourth multi-monitor.

A third embodiment will be described with respect to FIGS. 13A to 14. The third embodiment concerns a multi-monitor capable of improving the visibility of the liquid crystal display more than those of first and second embodiments.

In this multi-monitor, the supporting mechanism 20 of the second embodiment is mounted on a vertically slidable slide-supporting mechanism 30 attached on the CRT display 2 instead of being directly mounted on the CRT display 2.

The slide-supporting mechanism 30 is described. This slide-supporting mechanism 30 is comprised of an upper bracket 31, a lower bracket 32, an upper support member 33 mounted on the upper bracket 31, a lower support member 34 mounted on the lower bracket 32, two standing guide tubes 35a, 35b, two suspended guide tubes 36a, 36b, tubular bushings 37a, 37b, clamp bolts 38a, 38b, and a slide block 39. The upper bracket 31 has an L-shaped cross-section and is mounted on an upper corner portion of the casing 2a of the CRT display 2. The lower bracket 32 has an L-shaped-section and is mount on the bottom corner of the casing 2a. The guide tubes 35a, 35b have their bottom ends fixed to the upper support member 33, whereas the guide tubes 36a, 36b have their upper ends fixed to the lower support member 34. The bushings 37a, 37b are provided in upper inner portions of the standing guide tubes 35a, 35b and have internal threads formed in the inner surfaces. The clamp bolts 38a, 38b are so provided as to communicate the suspended guide tubes 36a, 36b and have external threads formed in specified areas extending from their bottom ends up to specified upper positions. The slide block 39 is slidably guided upward and downward by the suspended guide tubes 36a, 36b.

The first support member 33 is secured to the upper bracket 31 by a screw 40a, whereas the lower support member 34 is secured to the lower bracket 32 by a screw 40b. The outer diameter of the standing guide tubes 35a, 35b having their bottom ends fixed by the upper support member 33 is slightly smaller than the inner diameter of the suspended guide tubes 36a, 36b having their upper ends fixed by the lower support member 34, so that the guide tubes 35a, 35b can be fitted into the guide tubes 36a, 36b. The length of the guide tubes 35a, 35b to be fitted into the guide tubes 36a, 36b is adjusted by how much the clamp bolts 38a, 38b are screwed into the bushings 37a, 37b to thereby adjust the spacing between the upper support member 33 and the lower support member 34. Accordingly, the slide-supporting mechanism 30 can be mounted on casings of CRT displays having different heights by the above arrangement. Indicated at 40c in FIG. 14 are screws to be inserted into the bottom ends of the guide tubes 35a, 35b.

The slide block 39 is vertically slidable along the guide tubes 36a, 36b as described above, and the supporting mechanism 20 described in the second embodiment is mounted on this slide block 39 by screws 41. The slide block 39 is stayed at a desired position of the guide tubes 36a, 36b by a gripping means provided in the slide block 39. The gripping means grips the respective outer surfaces of the guide tubes 36a, 36b to hold the slide block 39 from falling down.

Accordingly, since the slide block 39 can slide vertically while being guided by the guide tubes 36a, 36b in this slide-supporting mechanism 30, the supporting mechanism 20 can be adjusted with respect to height direction.

Thus, the facing direction of the liquid crystal display 4 can be adjusted to any direction (upward and downward directions, leftward or rightward directions, or oblique directions) by the supporting mechanism 20 in addition to the height adjustment by the slide-supporting mechanism 30 in the third embodiment. Therefore, the liquid crystal display 4 can be adjusted to an easily seeable angle for any operator, thereby ensuring substantially the same effects as the second embodiment.

A fourth embodiment will be described with respect to FIGS. 15A to 19. A multi-monitor according to the fourth embodiment is provided with a supporting mechanism 50 for adjusting the height of the liquid crystal display 4 and adjusting the orientation of the liquid crystal display 4 to any desired direction.

This supporting mechanism 50 is provided with an upper bracket 51, a suspended guide member 52, a lower bracket 53, a slide member 54, a horizontally rotatable member 55, a shaft member 56 mounted on the rotatable member 55, and a bracket 57. The upper bracket 51 is to be mounted on an upper corner portion of the casing 2a of the CRT display 2 and has an L-shaped cross-section. The guide member 52 has its upper end supported by the upper bracket 51. The lower bracket 53 is provided at a lower portion of the guide member 52 at a side toward the casing 2a. The slide member 54 is vertically guided by the guide member 52. The horizontally rotatable member 55 is rotatably provided in forward and reverse directions about a vertical axis with respect to the slide member 54. The bracket 57 is rotatably provided in forward and reverse directions about a horizontal axis with respect to the shaft member 56, and the liquid crystal display 4 is to be mounted thereon.

The upper bracket 51 is adhered to the upper surface of the casing 2a by an adhesive double coated tape 51a, the lower bracket 53 is adhered to one side surface of the casing 2a by an adhesive double coated tape 53a, and the guide member 52 is suspended along the side surface of the casing 2a. The upper bracket 51 is mounted on the guide member 52 by screwing a screw 52g into a screw hole 51b, and the lower bracket 53 is mounted on the guide member 52 by screws 53a. Two elongated guide grooves 52a, 52b are formed side by side at the side of the guide member 52 opposite from the casing 2a. The opposite ends of the guide grooves 52a, 52b reach opposite end faces 52c, 52d of the guide member 52, and the end surfaces 52c, 52d are formed with openings having shapes corresponding to those of the guide grooves 52a, 52b.

On the other hand, the slide member 54 guided along the guide member 52 is formed with two guide claws 54a, 54b projecting toward the guide member 52. The guide claws 54a, 54b have such a cross-section that their leading ends are wider than their base ends and they are inserted into the guide grooves 52a, 52b through their upper end or lower end openings in such a manner as not to come out. The slide member 54 has a slide plate 54d which is fitted into the guide groove 52b so as to be slidable therealong. A support bar 54e provided on the slide plate 54d and having an external thread formed on its outer surface is inserted through a through hole 54f, and a fastening member 54g is screwed and firmly fastened onto the leading end of the support bar 54e, thereby holding the slide plate 54d at a specified height with respect to the guide member 52. Lids 52e, 52f are mounted on the upper and lower end surfaces of the guide member 52. The horizontally rotatable member 55 is rotatable in forward and reverse directions about a pin 58 with respect to the slide member 54 by coupling a fixing hinge 54c provided on the slide member 54 to a rotatable hinge 55a provided on the rotatable member 55 via the pin 58. The leading end of the pin 58 has an external thread formed thereon and projects out of the hinges 54c, 55a, and a fastening member 58a is screwed onto this projecting portion.

A horizontally extending round hole 55b is formed in the horizontally rotatable member 55, and one end 56a of the shaft member 56, which end has a round cross-section, is horizontally supported in the hole 55, so that the shaft member 56 is rotatable in forward and reverse directions with respect to the horizontally rotatable member 55.

Figure 18A:
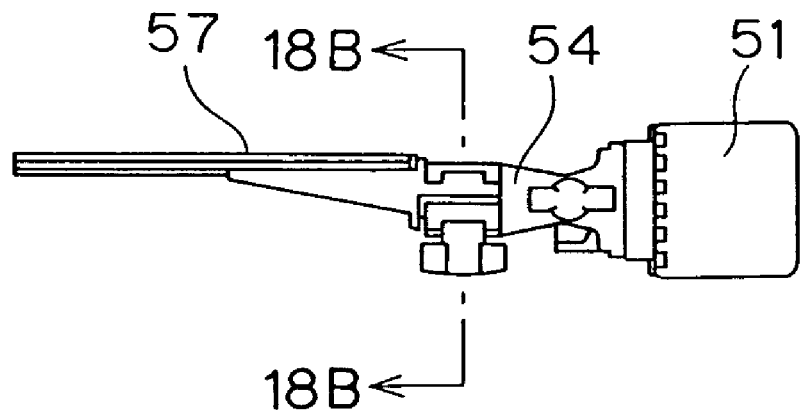
FIG. 18A is a plan view showing a part of the supporting mechanism of the liquid crystal display of the fourth multi-monitor.
Figure 18B:
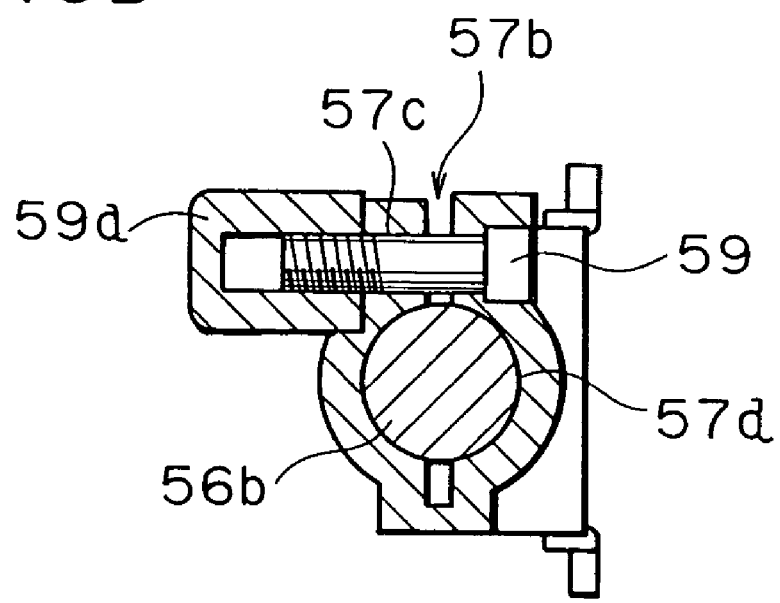
FIG. 18B is a sectional view taken along the line 18B—18B in FIG. 18A.

The bracket 57 has a round mount hole 57a at its side to be mounted on the shaft member 56, a slit 57b which is so formed as to reach the mount hole 57a, a pin insertion hole 57c which is so formed as to cross the slit 57b as shown in FIG. 18. An other end 56b of the shaft member 56 is inserted into a mount hole 57a, and a pin 59 is inserted into the pin insertion hole 57c and the fastening member 59a is screwed onto the leading end (formed with an external thread) of the pin 59, thereby narrowing the slit 57b to fix the other end 56b so as not to rotate.

Accordingly, the bracket 57 on which the liquid crystal display 4 is mounted is rotatable in forward and reverse directions about the horizontal axis via the one end 56a of the shaft member 56 and the hole 55b of the horizontally rotatable member 55, and is also rotatable in forward and reverse directions about the vertical shaft via the horizontally rotatable member 55, the slide member 54, and the pin 58. Further, the height of the bracket 57 can be changed via the slide member 54 and the guide member 52.

Figure 19:
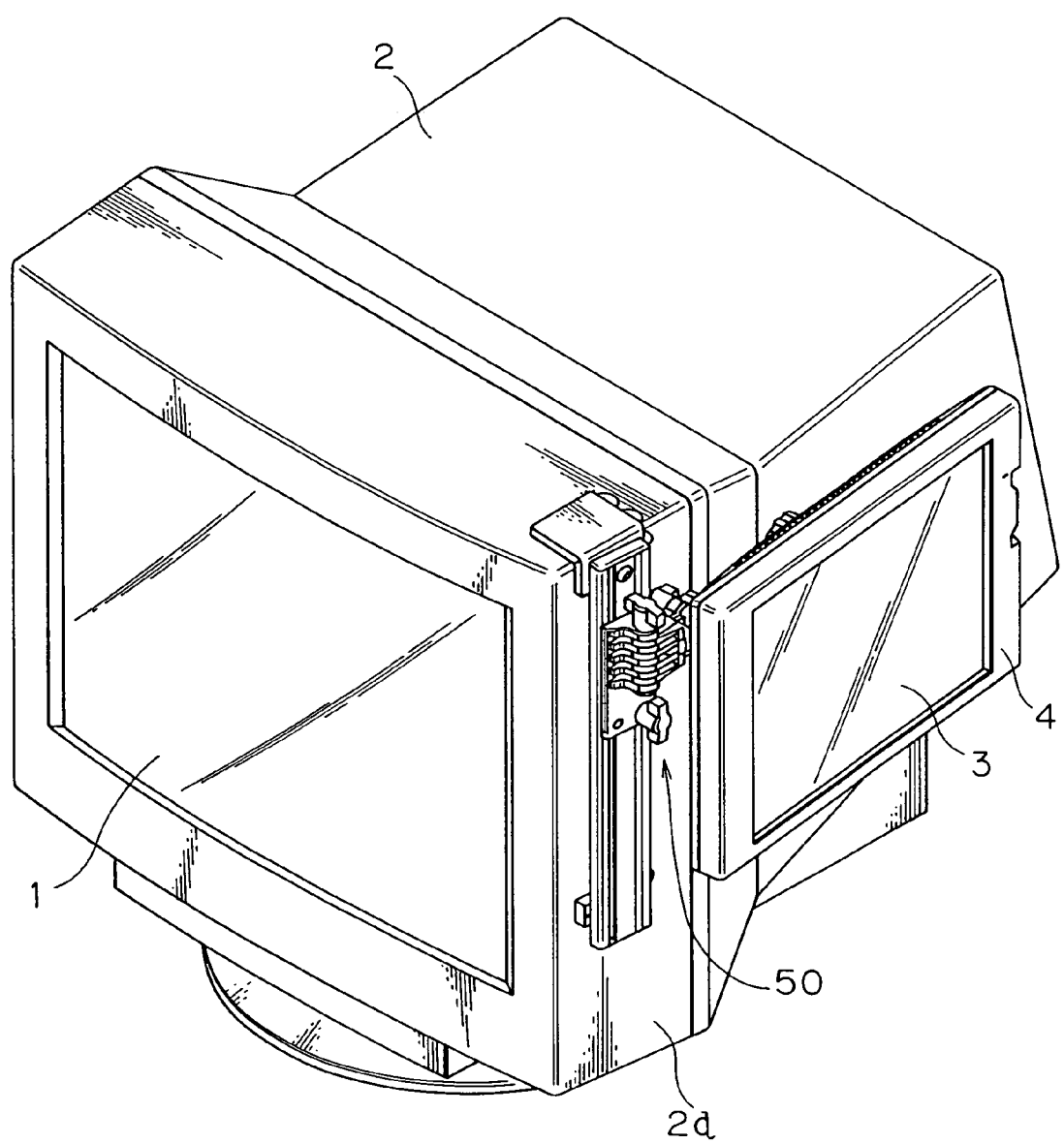
FIG. 19 is a perspective view showing a state where the liquid crystal display is held in an inoperative position in the fourth multi-monitor.

Therefore, the liquid crystal display 4 can have its height adjusted and its facing direction adjusted to any desired direction, thereby ensuring substantially the same effects as the third embodiment. Further, according to this embodiment, the liquid crystal display 4 can be kept along the side surface of the casing 2a of the CRT display 2 in a compact manner as shown in FIG. 19 as in the first embodiment.

A fifth embodiment will be described with respect to FIGS. 20A to 22B. This multi-monitor is provided with a supporting mechanism 60 which enables an adjustment of the facing direction of the liquid crystal display 4 to any desired direction.

This supporting mechanism 60 includes an upper bracket 61, a guide member 62, a slide member 64, a horizontally rotatable member 65, an arm 66, and a ball joint 67. The upper bracket 61 is mounted on the upper side end of the casing 2a of the CRT display 2. The guide member 62 has its upper end supported by the upper bracket 61 and has a built-in interface. The slide member 64 is vertically guided by the guide member 62. The horizontally rotatable member 65 is rotatably provided in forward and reverse directions about a vertical shaft with respect to the slide member 64. The arm 66 has its base end mounted on the horizontally rotatable member 65. The ball joint 67 is provided at the leading end of the arm 66.

The upper bracket 61 is adhered to the upper surface of the casing 2a by an adhesive double coated tape 61b. The guide member 62 is fixed via the upper bracket 61 in such a state where it hangs down along the side surface of the casing 2a by inserting a support bar 61a provided on the upper bracket 61 into a through hole 62a formed in the guide member 62 and mounting a fixing knob 68 onto the leading end of the support bar 61a extending through the through hole 62a. Further, a lower portion of the guide member 62 is adhered to the side surface of the casing by a number of adhesive dual coated tape 62b.

Figure 20A:
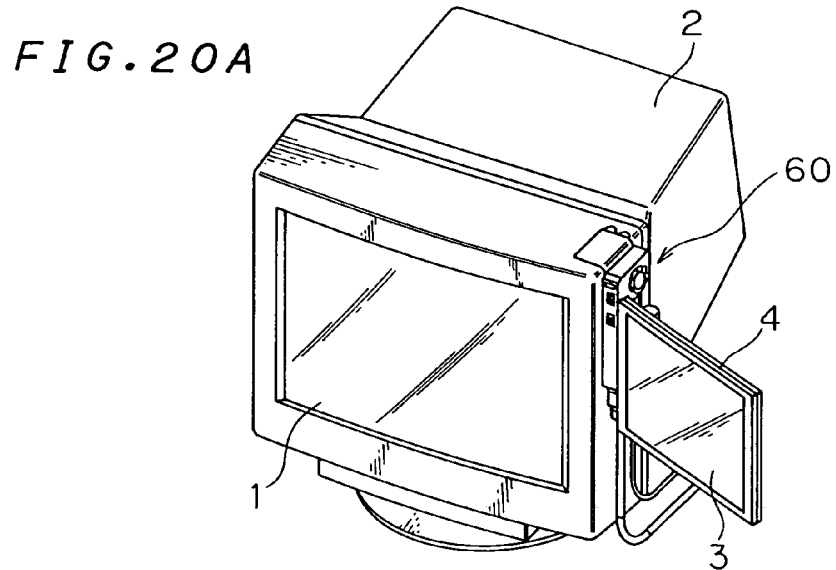
FIG. 20A is a perspective view of a mu lti-monitor according to a fifth embodiment when viewed obliquely from above at the front side.
Figure 20B:
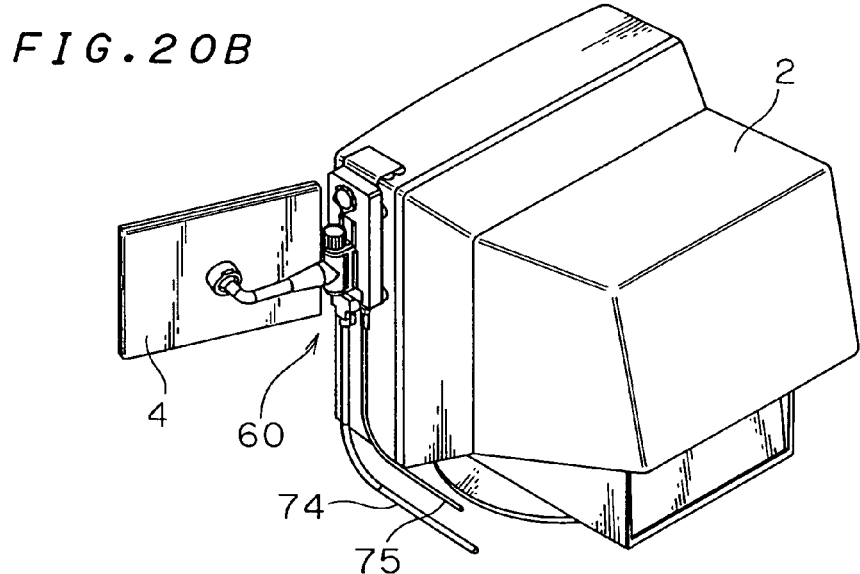
FIG. 20B is a perspective view of the fifth multi-monitor when viewed obliquely from above at the rear side.
Figure 20C:
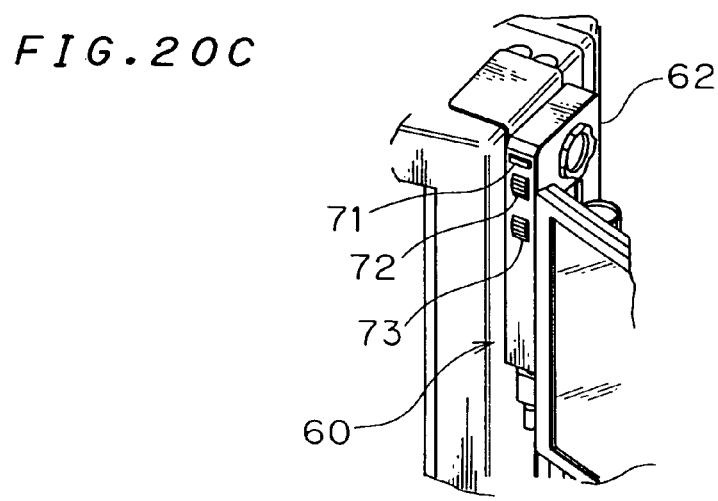
FIG. 20C is an enlarged perspective view of a mount portion of the liquid crystal display when viewed obliquely from above at the front side.
Figure 21:
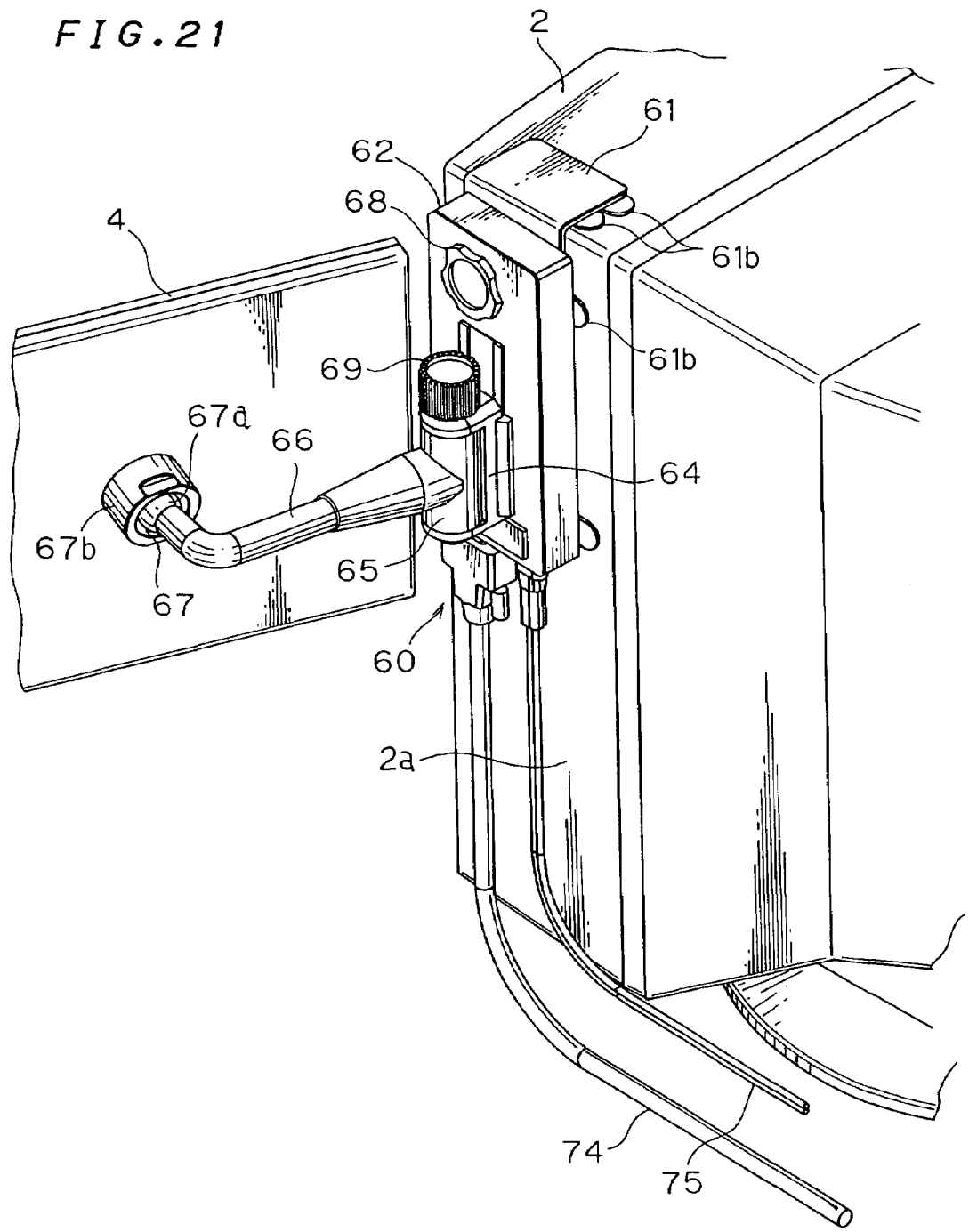
FIG. 21 is a perspective view of a supporting mechanism of a liquid crystal display of the fifth multi-monitor when viewed obliquely from above the rear side.

As shown in FIG. 20C, a power switch 71, a contrast adjustment dial 72, and a brightness adjustment dial 73 are provided on the front surface of the guide member 62, and a video cable 74 and a power cable 75 are joined with a lower portion of the guide member 62. A wiring (not shown) joined with the video cable 74 is electrically connected with the liquid crystal display 4 through the horizontally rotatable member 65 and the arm 66.

The other end of the video cable 74 is connected with an unillustrated computer main body, and a digital image signal for the liquid crystal display 4 which is outputted from the computer main body is given to the interface built in the guide member 62. It should be noted that the computer main body outputs not only the digital image signals for the liquid crystal display 4, but also analog image signals for CRT display 2.

Figure 22A:
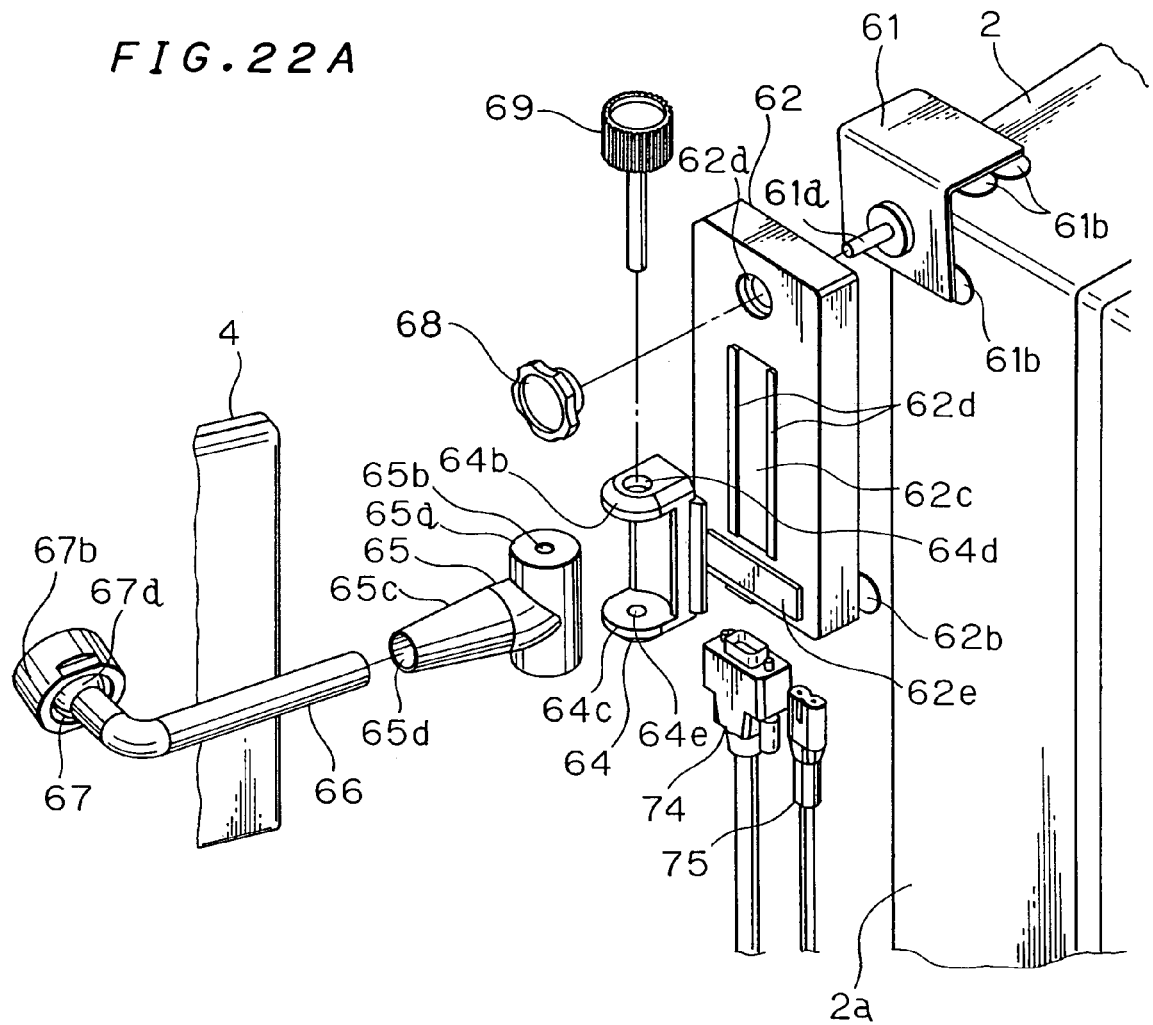
FIG. 22A is an exploded perspective view of the supporting mechanism of the fifth multi-monitor.
Figure 22B:
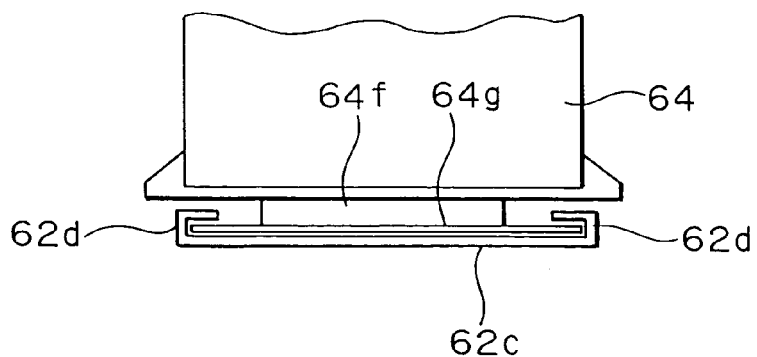
FIG. 22B is a plan view showing a part of the supporting mechanism.

On the side of the guide member 62 opposite from the casing 2a is mounted a guide piece 62c, which has slide grooves 62d formed by bending the opposite ends of the guide piece 62c toward the side opposite from the casing 2a. The slide grooves 62d extend vertically. The opposite ends of a slide piece 64g provided on the slide member 64 via a support portion 64f are slidably mounted in the grooves 62d as shown in FIG. 22B. The slide member 64 is supported by a drop preventing portion 62e formed below the guide piece 62c of the guide member 62 by the contact of its bottom end therewith.

Support pieces 64b, 64c project from the top and bottom ends of the slide member 64 at the side opposite from the casing 2a so as to face each other. A base portion 65a of the horizontally rotatable member 65 is fitted between the support pieces 64b, 64c, and the fixing knob 69 is so mounted as to pass through a through hole 65b formed in the base portion 65a and through holes 64d, 64e respectively formed in the support pieces 64b, 64c, with the result that the horizontally rotatable member 65 is made rotatable in forward and reverse directions about a vertical shaft with respect to the slide member 64.

The horizontally rotatable member 65 has a horizontally extending arm holding portion 65c connected with the base portion 65a, and the base end of the arm 66 is held in an arm mount hole 65d formed in the holding portion 65c. A ball of the ball joint 67 is provided at the leading end of the arm 66, and the rear surface of the liquid crystal display 4 is mounted on a ball bearing 67b of the ball joint 67.

Accordingly, in the fifth embodiment, the liquid crystal display 4 can have its facing direction adjusted to any desired direction by the ball joint 67 and can rotate in forward and reverse directions about the vertical shaft via the horizontally rotatable member 65 and the slide member 64, thereby ensuring substantially the same effects as the second embodiment. Further, the computer main body outputs analog image signals for the CRT display 2 and digital image signals for the liquid crystal display 4. The digital image signals are sent to the interface built in the guide member 62. Since the interface is built in the supporting mechanism 60, the liquid crystal display 4 can be made thinner and lighter. More specifically, in the case that only the analog image signals for the CRT display 2 are outputted from the computer main body and the analog image signals are converted into digital image signals, a circuit board as a converting means is generally built in the liquid crystal display 4. In such a case, the liquid crystal display 4 is itself heavy. This causes a problem that the orientation of the liquid crystal display 4 changes by the action of gravity even if the liquid crystal display 4 is oriented to a desired direction. This problem can be solved by the fifth embodiment.

Figure 23A:
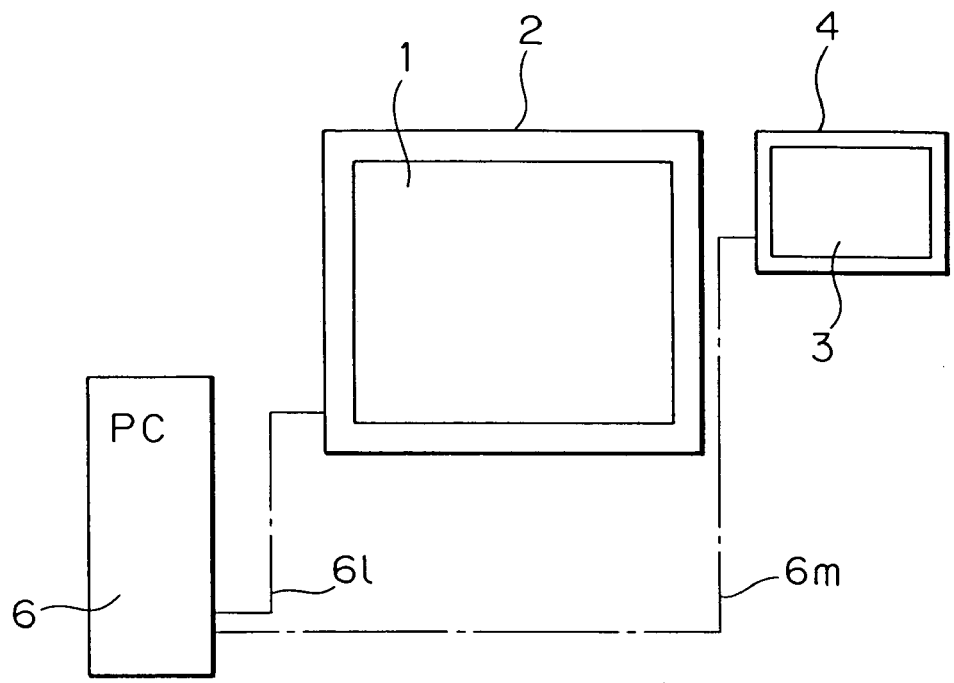
FIGS. 23A and 23B are diagrams showing wiring arrangements of the inventive multi-monitor.
Figure 23B:
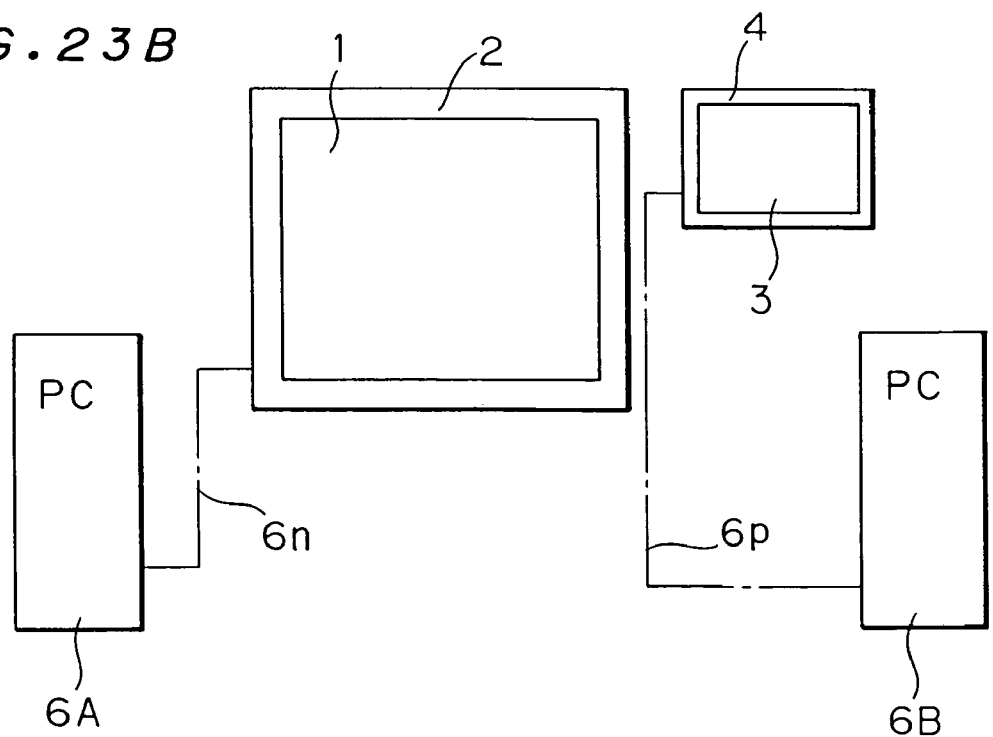

In this case, the computer main body, the CRT display 2, and the liquid crystal display 4 are wired as shown in FIG. 23A. A wiring 61 is provided between the computer main body 6 and the CRT display 2, and a wiring 6m is provided between the computer main body 6 and the liquid crystal display 4. However, wiring for the inventive multi-monitor may also be as shown in FIG. 23 B. Using a computer main body 6A for the CRT display 2 and a computer main body 6B for the liquid crystal display 4, a wiring 6n is provided between the computer main body 6A and the CRT display 2 and a wiring 6p is provided between the computer main body 6B and the liquid crystal display 4.

Although one liquid crystal display 4 is provided for the CRT display 2 in the first to fifth embodiments, the invention is not limited to this arrangement. Two or more liquid crystal displays 4 may be provided for the CRT display 2.

Figure 24A:
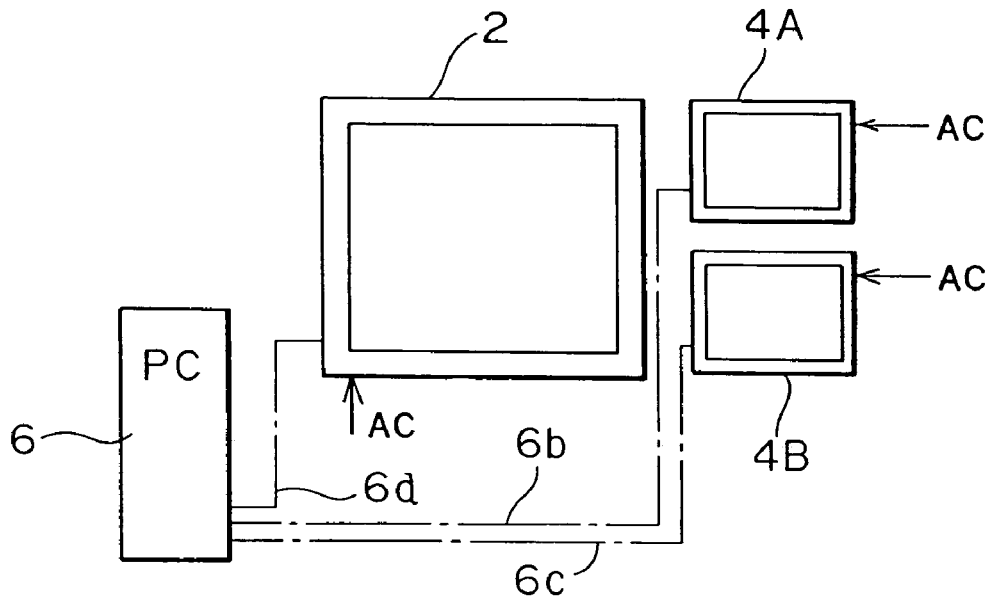
FIGS. 24A, 24B and 24C are diagrams showing another wiring arrangements of the inventive multi-monitor.
Figure 24B:
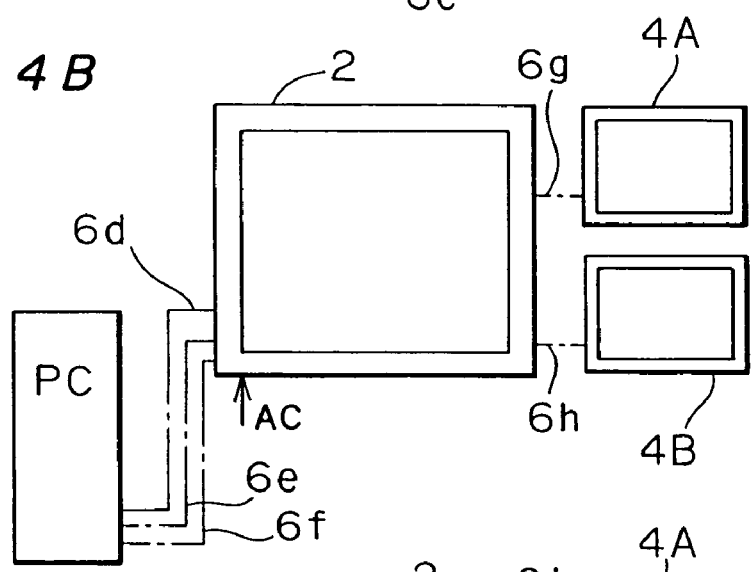
Figure 24C:
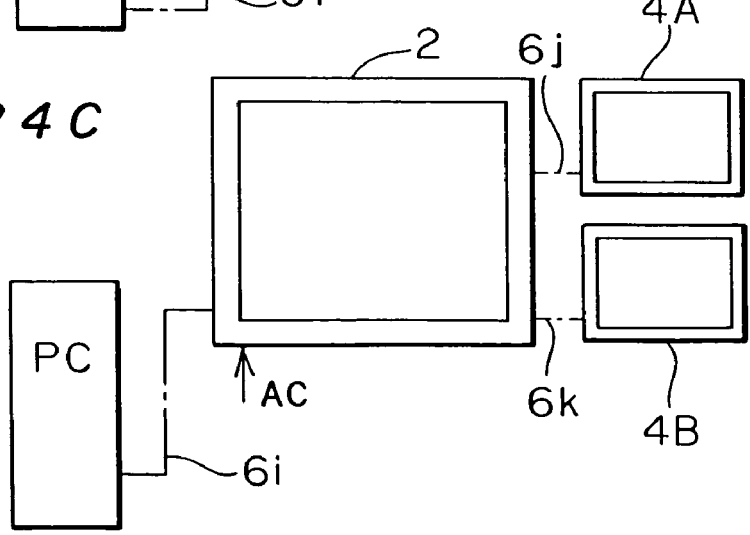

FIGS. 24A to 24C show wiring arrangements in such a case. FIG. 24A shows a wiring arrangement in which wirings 6a, 6b, 6c for separately sending image signals from one computer main body 6 to the CRT display 2 and the liquid crystal displays 4A, 4B. This arrangement necessitates a costly wiring and a complicated structure.

FIG. 24B shows a wiring arrangement in which three wirings 6d, 6e, 6f are provided between one computer main body 6 and the CRT display 2 and two wirings 6g, 6h are provided between the CRT display 2 and the respective liquid crystal displays 4A and 4B. In this construction, analog image signals for the CRT display 2 are sent from the computer main body 6 to the CRT display 2 via the wiring 6d; digital image signals for the liquid crystal display 4A are sent from the computer main body 6 to the CRT display 2 via the wiring 6e; and digital image signals for the liquid crystal display 4B are sent from the computer main body 6 to the CRT display 2 via the wiring 6f. Thereafter, the digital image signals for the liquid crystal display 4A are sent to the liquid crystal display 4A via the wiring 6g through the CRT display 2. Likewise, the digital image signals for the liquid crystal display 4B are sent to the liquid crystal display 4B via the wiring 6h through the CRT display 2. In this construction, the wirings 6g, 6h are not exposed to the outside by being connected by connectors and, therefore, can be integrated into the CRT display 2.

FIG. 24C shows a wiring arrangement in which analog image signals for the CRT display 2 and digital image signals for the two liquid crystal displays 4A and 4B are sent to the CRT display 2 via one wiring, and then the digital image signals for the liquid crystal display 4A are sent from the CRT display 2 to the liquid crystal display 4A via a wiring 6j while those for the liquid crystal display 4B are sent to the liquid crystal display 4B via a wiring 6k. In this construction, the wirings 6j, 6k are not exposed to the outside by being connected by connectors, and the computer main body 6 and the CRT display 2 are connected by only one cable.

What is described with reference to FIGS. 23A and 24C also applies to cases where three or more liquid crystal displays are provided for the CRT display 2.

Figure 25A:
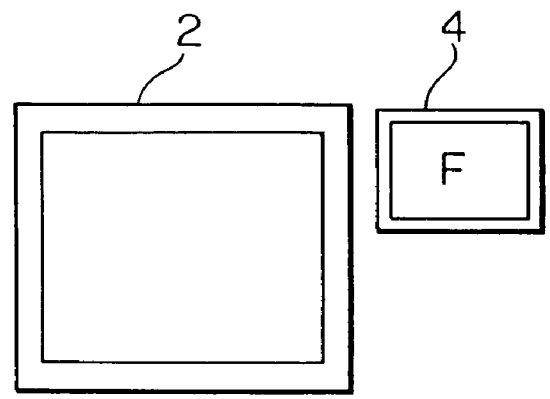
FIGS. 25A, 25B, 25C and 25D are diagrams showing examples of the mount direction of a flat panel in the inventive multi-monitor.
Figure 25B:
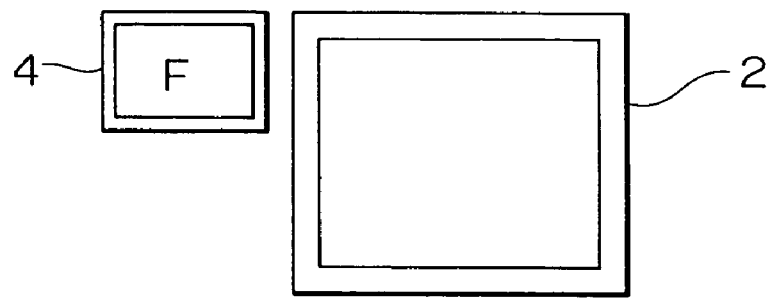
Figure 25C:
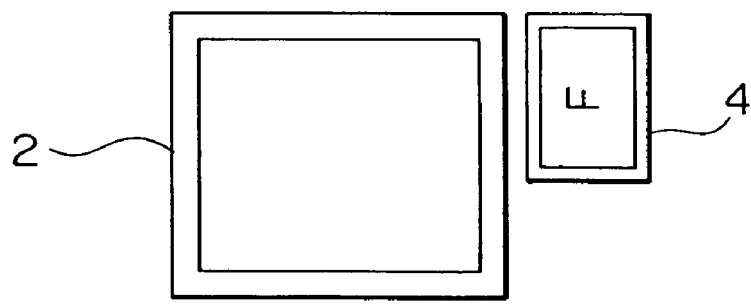
Figure 25D:
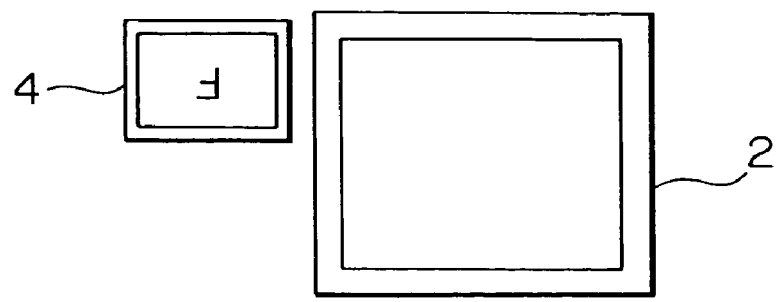

The liquid crystal display 4 is mountable on the CRT display 2 in various manners. Generally, the horizontally long liquid crystal display 4 is so mounted on the left or right side of the CRT display 2 as to horizontally extend as shown in FIGS. 25A and 25B. Alternatively, the horizontally long liquid crystal display 4 may be so mounted as to vertically extend as shown in FIG. 25C or may be mounted upside down as shown in FIG. 25D. However, in the case of FIG. 25C, it is preferable to process the image data in the computer main body in order to realize a vertically long display of images. On the other hand, in the case of FIG. 25D, an erect image can be displayed even in the upside-down liquid crystal display by inverting the image data.

As described above, the work space on the desk can be remarkably increased to improve the operability by arranging the flat panel having a small display screen on the side or upper surface of the casing of the main display device having a large display screen and driving the display main device and the flat panel by the same operating system.

Further, upon the receipt of an electronic mail, it can be displayed on the flat panel to confirm the importance and urgency thereof and to grasp the content thereof. Since the operation is not unnecessarily interrupted, the operation efficiency can be remarkably improved.

(1) Although one liquid crystal display is arranged on the side surface of the casing 2a in the foregoing embodiment, it may be provided on the upper surface of the casing 2a or two, three or more liquid crystal displays may be provided on the side or upper surface of the casing 2a.

(2) Although the CRT display is used as a display main device having a large display screen in the foregoing embodiment, a large liquid crystal display or plasma display may be used instead, and a small liquid crystal display may be provided on a casing thereof.

(3) Although the liquid crystal display is used as a flat panel having a small display screen in the foregoing embodiment, a small plasma display or EL display may be used instead.

(4) Although the base members 11, 11a are fixed by the adhesive double coated tapes 13 in the foregoing embodiment, magnetic base members may be attached to a metal casing instead. This enables the base members to be more easily and freely fixed in desired positions.

In summary, an inventive multi-monitor comprises a first display device including a large display screen, and a flat second display device having a small display screen, which panel is provided on at least either one of the side and upper surfaces of a casing of the first display device. The first and second display screens are driven by the same operating system.

With the multi-monitor constructed as above, the second display device having the small display screen is provided on the side or upper surface of the casing of the first display device having the large display screen, and the both display screens are driven by the same operating system. Accordingly, the work space on a desk is considerably increased, thereby improving the operability. Further, upon the receipt of an electronic mail, the importance and/or urgency thereof can be confirmed and the content thereof can be grasped by displaying it on the second display device without unnecessarily interrupting the operation, thereby improving the operation efficiency to a large degree.

Preferably, the second display device may be mounted on the first display device via a supporting mechanism.

Preferably, the supporting mechanism can adjust the facing direction of the small display screen of the second display device to at least either one of the vertical and horizontal directions.

With this arrangement, the facing direction of the second display device is adjustable to at least either one of the vertical and horizontal directions. This enables the facing direction of the second display device to be adjusted in oblique directions. Thus, even if a liquid crystal display having a directivity in viewing angle characteristic is used as the second display device, it can be adjusted to an easily seeable angle despite its viewing angle characteristic. Further, the above can prevent the second display device from becoming hard to see due to the reflection of an external light (e.g., room light, light through a window).

In order to enable such an adjustment, the supporting mechanism may include a first support member for supporting the second display device in such a manner that the facing direction of the small display screen of the second display device can be adjusted to at least either one of the vertical and horizontal directions, and a second support member mounted on the casing of the first display device for slidably supporting the first support member with respect to either one of the vertical and horizontal directions.

In this construction, since the height of the second display device can be adjust, the second display device can be made easily seeable even for operators having different sitting heights in addition to the above effects.

Preferably, there is further an image signal output device for outputting an image signal representing an image to be displayed on the large display screen of the first display device. The image signal output device is also adapted to output an image signal representing an image to displayed on the small display screen of the second display device.

In this construction, the image to be displayed on the large display screen of the first display device and the one to be displayed on the small display screen of the second display device may be different, or the same. The latter case is convenient, for example, in a case where a part of the same text comprised of a plurality of pages is displayed on the small display screen of the second display device, and this displayed part of the text is pasted on the text displayed on the large display screen of the first display device.

Preferably, there are further provided a first image signal output device for outputting an image signal representing an image to be displayed on the large display screen of the first display device, and a second image signal output device for outputting an image signal representing an image to be displayed on the small display screen of the second display device.

Preferably, wirings for sending image signals from the image signal output device are provided between the image signal output device and the first display device and between the image signal output device and the second display device, and wherein the image signals from the image signal output device are sent to the first and second display devices via the separate wirings.

Alternatively, the image signals from the image signal output device are sent to the second display device after being sent to the first display device. In this case, the wirings can be rationalized.

Preferably, a plurality of the second display devices may be provided for the first display device; the image signal output device for outputting image signals representing images to be displayed on the large display screen of the first display device may also be adapted to output image signals representing images to displayed on the small display screens of the second display devices; a single wiring for sending the image signals from the image signal output device may be provided between the image signal output device and the first display device, and wirings may be provided between the first display device and the second display device. The image signals from the image signal output device may be sent to the respective second display devices after being sent to the first display device. In this case, the rationalization of the wirings can be further improved.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A multi-monitor, comprising:
   a first display device having a display screen;
   a second display device having a display screen smaller than the first display device; and
   a supporting mechanism which is detachably mountable on an outside surface of the first display device, and supports the second display device rotatably about a first axis and a second axis intersecting the first axis, the supporting mechanism being supported by the first display device;
   wherein the first axis is parallel with a horizontal direction of the display screen of the first display device, and the second axis is parallel with a vertical direction of the display screen of the first display device, and
   wherein the supporting mechanism includes:
   a first support member which supports the second display device rotatably about the first and second axes; and
   a second support member which is mounted on at least one of a side outside surface and a top outside surface of the first display device, and supports the first support member slidably in parallel with either one of the vertical and horizontal directions of the display screen of the first display device, wherein the second support member comprises a round tubular bracket, which is detachably mountable on a side outside surface and a top outside surface of the first display device using two fixing blocks, each fixing block having a locking member,
   wherein the first support member includes a single arm, and the arm is directly connected to both the second display device and the second support member.

2. A multi-monitor according to claim 1, wherein the second display device is driven in accordance with the same operation system as the first display device.

3. A multi-monitor according to claim 2, further comprising:
   a first image signal output device which outputs an image signal representing an image to be displayed on the display screen of the first display device; and
   a second image signal output device which outputs an image signal representing an image to be displayed on the display screen of the second display device.

4. A multi-monitor according to claim 2, further comprising an image signal output device which outputs an image signal representing an image to be displayed on the display screen of the first display device, and an image signal representing an image to be displayed on the display screen of the second display device.

5. A multi-monitor according to claim 4, further comprising:
   a first wiring which connects the image signal output device with the first display device; and
   a second wiring which connects the image signal output device with the second display device.

6. A multi-monitor according to claim 4, further comprising:
   a first wiring which connects the image signal output device with the first display device; and
   a second wiring which connects the first display device with the second display device.

7. A multi-monitor according to claim 1, further comprising one or more display devices each having a display screen smaller than that of the first display device.

8. A multi-monitor according to claim 1 wherein a first end of the second support member is adapted to be mounted on at least one side outside portion of the first display device and another end of the second support member is adapted to be mounted to one of a top outside surface and a bottom portion of the first display device.

9. A multi-monitor according to claim 8 wherein the supporting mechanism is detachably mountable on the first display device.

10. A multi-monitor according to claim 9, further comprising one or more display devices each having a display screen smaller than that of the first display device.

11. An auxiliary monitor comprising:
   a main body having a display screen; and
   a supporting mechanism adapted to be detachably mounted on at least one of a side outside surface and a top outside surface of a mother monitor having a display screen larger than that of the main body, and supports the main body rotatably about a first axis and a second axis intersecting the first axis, the supporting mechanism being supported by the mother monitor;
   wherein the first axis is parallel with a horizontal direction of the display screen of the mother monitor, and the second axis is parallel with a vertical direction of the display screen of the mother monitor, and
   wherein the supporting mechanism includes:
   a first support member which supports the main body rotatably about the first and second axes; and
   a second support member which is mountable on an outside surface of the mother monitor, and supports the first support member slidably in parallel with either one of the vertical and horizontal directions of the display screen of the mother monitor, wherein the second support member comprises a round tubular bracket, which is detachably mountable on a side outside surface and a top outside surface of the mother monitor using two fixing blocks, each fixing block having a locking member,
   wherein the first support member includes a single arm, and the arm is directly connected to both the main body and the second support member.

12. An auxiliary monitor according to claim 11, wherein the main body is driven in accordance with the same operation system as the mother monitor.

13. A multi-monitor according to claim 11 wherein a first end of the second support member is adapted to be mounted on at least one side portion of the first display device and another end of the second support member is adapted to be mounted to one of a top portion and a bottom portion of the mother monitor.

14. A monitor supporter comprising:
   a first support member which supports an auxiliary display device rotatably about a first axis and a second axis intersecting the first axis; and
   a second support member adapted to be detachably mounted on at least one of a side outside surface and a top outside surface of a mother display device having a larger display screen than that of the auxiliary display device, and supports the first support member, wherein the second support member comprises a round tubular bracket, which is detachably mountable on a side outside surface and a ton outside surface of the mother display device using two fixing blocks, each fixing block having a locking member;
   wherein the first support member includes a single arm, and the arm is directly connected to both the auxiliary display device and the second support member, and
   wherein the first support member is slidable on the second support member.

15. A monitor supporter according to claim 14, wherein the first axis is parallel with a horizontal direction of the display screen of the mother display device, and the second axis is parallel with a vertical direction of the display screen of the mother display device.

16. A multi-monitor according to claim 14 a first end of the second support member is adapted to be mounted on at least one side portion of the first display device and another end of the second support member is adapted to be mounted to one of a top portion and a bottom portion of the mother monitor.

* * * * *